United States Patent
Fan et al.

(10) Patent No.: US 11,329,724 B2
(45) Date of Patent: May 10, 2022

(54) STATE OF POLARIZATION TRACKING RECOVERY METHOD AND APPARATUS

(71) Applicant: Fujitsu Limited, Kawasaki (JP)

(72) Inventors: Yangyang Fan, Beijing (CN); Jingnan Li, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/321,850

(22) Filed: May 17, 2021

(65) Prior Publication Data

US 2021/0399803 A1    Dec. 23, 2021

(30) Foreign Application Priority Data

Jun. 17, 2020    (CN) .......................... 202010552449.4

(51) Int. Cl.
*H04B 10/25*   (2013.01)
*H04J 14/06*   (2006.01)
*H04B 10/2507*   (2013.01)

(52) U.S. Cl.
CPC .......... *H04B 10/2572* (2013.01); *H04J 14/06* (2013.01)

(58) Field of Classification Search
CPC ............................. H04B 10/2572; H04J 14/06
See application file for complete search history.

(56) References Cited

U.S. PATENT DOCUMENTS

| | | |
|---|---|---|
| 5,965,874 A | 10/1999 | Aso et al. |
| 8,121,480 B2 | 2/2012 | Szafraniec et al. |
| 9,716,564 B2 | 7/2017 | Schmogrow |
| 2012/0207475 A1 | 8/2012 | Tian et al. |
| 2014/0050476 A1 | 2/2014 | Grigoryan et al. |
| 2014/0363164 A1 | 12/2014 | Kim et al. |
| 2014/0376917 A1 | 12/2014 | Grigoryan et al. |

(Continued)

FOREIGN PATENT DOCUMENTS

CN    102045127    5/2011

OTHER PUBLICATIONS

Cui et al. May 31, 2020. "True Equalization of Polarization-Dependent Loss in Presence of Fast Rotation of SOP" Applied Sciences 10, No. 11: 3844. https://doi.org/10.3390/app10113844. (Year: 2020).*

Muga et al.; "Using the Stokes Space for Equalization of Polarization Impairments in Digital Coherent Optical Receivers"; Jul. 1, 2016, 2016 18th International Conference on Transparent Optical Networks (ICTON) (pp. 1-5); doi: 10.1109/ICTON .2016.7550262. (Year: 2016).*

(Continued)

*Primary Examiner* — Nathan M Cors
(74) *Attorney, Agent, or Firm* — Staas & Halsey LLP

(57) ABSTRACT

A state of polarization tracking recovery method and apparatus. The apparatus at least includes a processor configured to fit Stokes vectors to which predetermined symbols correspond of two states of polarization in a received dual-polarization multiplexing optical signal on a Poincare sphere to obtain a fitted plane. The processor calculates a compensation matrix for polarization-dependent loss (PDL) in a Jones space by moving a center of the fitted plane to the origin of the Poincare sphere, and calculates a demultiplexing matrix used for polarization demultiplexing in a Jones space by rotating the fitted plane with the center being moved to the origin until a normal vector of the fitted plane is parallel with a first axis of the Stokes space and rotating the fitted plane with the center being moved to the origin to a plane constituted by a second axis and a third axis of the Stokes space.

14 Claims, 17 Drawing Sheets

(56) References Cited

U.S. PATENT DOCUMENTS

2015/0030331 A1* 1/2015 Salsi ............ H04B 10/6166
398/65
2016/0204894 A1 7/2016 Dong et al.

OTHER PUBLICATIONS

Zhou Xian et al, "Polarization Division Multiplexing System with Direct Decision for Short Reach Optical Communications", Journal of Beijing University of Posts and Telecommunications, vol. 40 No. 2, Apr. 2017, 8 pages.
P.M. Krummrich, et al., "Extremely fast (microsecond timescale) polarization changes in high speed long haul WDM transmission systems", OFC2004, FI3, Siemens AG, Information and Communication Networks, Carrier Products, Hofmannstr. 51, 81359 Munich, German, 2004, 3 pages.
Bogdan Szafraniec, et al., "Polarization demultiplexing in Stokes space", Optics Express, vol. 18, No. 17, Aug. 2010, 12 pages.
Nelson J. Muga et al., "Digital PDL Compensation in 3D Stokes Space", Journal of Lightwave Technology, vol. 31, No. 13, Jul. 1, 2013, 9 pages.
M. S. Faruk, et al., "Digital Signal Processing for Coherent Transceivers Employing Multilevel Formats", J. Lightwave Technol., vol. 35, No. 5, 2017, 18 pages.
Zhang xiaoguang et al., "Polarization Mode Dispersion in Fibers—Principle, Measurement, and Adaptive Compensation". Beijing University of Posts and Telecommunications Press, pp. 18 and 24, Jun. 2017, 7 pages.

\* cited by examiner

STATE OF POLARIZATION TRACKING RECOVERY METHOD AND APPARATUS

CROSS-REFERENCE TO RELATED APPLICATIONS

This application is based on and hereby claims priority to Chinese Application No. 202010552449.4, filed Jun. 17, 2020, in the State Intellectual Property Office of China, the disclosure of which is incorporated herein by reference.

TECHNICAL FIELD

This disclosure relates to the field of communication technologies.

BACKGROUND

Coherent optical communication has become the dominant technology of the next generation of optical communication systems. In order to increase the communication rate, on the one hand, the frequency spectrum bandwidth of the system can be increased, and on the other hand, the spectrum utilization may be increased. In order to increase the spectrum utilization, the number of bits carried by symbols of the system may be increased, from simple amplitude modulation to higher-order quadrature amplitude modulation, and then a polarization division multiplexing technique is used to transmit two paths of orthogonal states of polarization at the same time, thereby increasing the transmission rate. However, there will be various polarization-dependent damages in optical fiber transmission links, such as fiber loss, chromatic dispersion, and polarization effect damage. These damages will cause distortion of dual-polarization modulated optical signals. Due to the influence of the undesirable external environment of the optical fiber during the manufacturing process, directions of the polarization main axes (fast axis and slow axis) of different parts of the optical fiber will be different. Therefore, the state of polarization (SOP) of the received dual polarization modulated optical signal usually changes, resulting in rotation of the state of polarization (RSOP), and this change is generally slow. But in some cases, such as lightning strikes, a rate of the rotation of SOP will reach a magnitude of megahertz. Moreover, a polarization-dependent loss (PDL) existing in a transmission link also changes the SOP of the dual-polarization modulated optical signal. For the polarization multiplexing system, it is necessary to achieve polarization demultiplexing of a signal in a received signal at a receiver end. In order to recover the SOP of the received signal, it is necessary to track recovery of the SOP under a PDL effect.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided a state of polarization tracking recovery apparatus, wherein the apparatus includes: a memory that stores a plurality of instructions and a processor coupled to the memory.

The processor is configured to convert Jones vectors constituted by predetermined symbols of two states of polarization in a received dual-polarization multiplexing optical signal into Stokes vectors; fit the Stokes vectors to which the predetermined symbols correspond on a Poincare sphere to obtain a fitted plane; and calculate a compensation matrix used for compensation for polarization-dependent loss (PDL) in a Jones space, wherein the compensation matrix is calculated by moving a center of the fitted plane to an origin of the Poincare sphere.

According to an embodiment, the processor is configured to calculate a demultiplexing matrix used for polarization demultiplexing in the Jones space, wherein the demultiplexing matrix is calculated by rotating the fitted plane with the center of the fitted plane being moved to the origin until a normal vector of the fitted plane is parallel with a first axis of the Stokes space and rotating the fitted plane with the center of the fitted plane being moved to the origin to a plane constituted by a second axis and a third axis of the Stokes space.

According to an embodiment, the processor is configured to calculate a state of polarization (SOP) first rotation matrix to which the predetermined symbols correspond according to the compensation matrix and the demultiplexing matrix; calculate a state of polarization (SOP) second rotation matrix of the optical received signal at each moment according to the state of polarization (SOP) first rotation matrix to which the predetermined symbols correspond; and multiply a two-dimensional vector constituted by two states of polarization in the optical received signal by the state of polarization (SOP) second rotation matrix to recover optical received signal in two states of polarization in the optical received signal.

According to an embodiment of this disclosure, there is provided a state of polarization tracking recovery apparatus, wherein the apparatus includes a memory and a processor where the processor is configured to convert Jones vectors constituted by pilot symbols of two states of polarization in a received dual-polarization multiplexing optical signal into Stokes vectors; and fit the Stokes vectors to which the pilot symbols correspond on a Poincare sphere to obtain a fitted plane.

According to an embodiment, the processor is configured to calculate a compensation matrix used for compensation for polarization-dependent loss (PDL) in a Jones space, and calculate a demultiplexing matrix used for polarization demultiplexing in the Jones space according to the pilot symbols, the compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space.

According to an embodiment, the processor is configured to calculate a state of polarization (SOP) first rotation matrix to which the pilot symbols correspond according to the compensation matrix and the demultiplexing matrix; calculate a state of polarization (SOP) second rotation matrix of the optical received signal at each moment according to the state of polarization (SOP) first rotation matrix to which the pilot symbols correspond; and multiply a two-dimensional vector constituted by two states of polarization in the optical received signal by the state of polarization (SOP) second rotation matrix to recover optical received signals in two states of polarization in the optical received signal.

According to an embodiment of this disclosure, there is provided a state of polarization tracking recovery apparatus, wherein the apparatus includes a memory and a processor. The processor, according to an embodiment, is configured to convert Jones vectors constituted by predetermined symbols in two states of polarization in a received dual-polarization multiplexing optical signal into Stokes vectors; fit the Stokes vectors to which the predetermined symbols correspond on a Poincare sphere to obtain a fitted plane; calculate a first compensation matrix used for compensation for polarization-dependent loss (PDL) in a Jones space, and calculate a demultiplexing matrix used for polarization demultiplexing in the Jones space, the compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space.

According to an embodiment, the processor is configured to calculate a second compensation matrix used for compensation for phase in the Jones space; calculate a state of polarization (SOP) first rotation matrix to which the predetermined symbols correspond according to the first compensation matrix, the demultiplexing matrix and the second compensation matrix; calculate a state of polarization (SOP) second rotation matrix of the optical received signal at each moment according to the state of polarization (SOP) first rotation matrix to which the predetermined symbols correspond; and multiply a two-dimensional vector constituted by two states of polarization in the optical received signal by the state of polarization (SOP) second rotation matrix to recover optical received signals in two states of polarization in the optical received signal.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, operations or components but does not preclude the presence or addition of one or more other features, integers, operations, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort.

In the drawings.

DETAILED DESCRIPTION

Figure 1A:
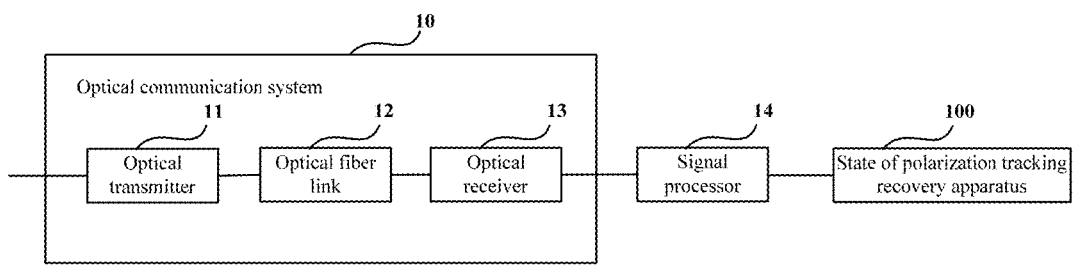
FIGS. 1A and 1B are schematic diagrams of an optical communication system of an embodiment of this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims. Various embodiments of this disclosure shall be described below with reference to the accompanying drawings. These embodiments are illustrative only, and are not intended to limit this disclosure.

It was found by the inventors that in an existing method, characteristics of the polarization multiplexed signal distributed in the Stokes domain may be used to find an inverse matrix (rotation matrix) to recover the original state of polarization. However, in the process of calculating the inverse matrix, PDL compensation is performed after polarization demultiplexing, and the calculation complexity is very high.

In addition, it was also found by the inventors that in the existing method, the received signal is first mapped to points on a Poincare sphere to fit into a fitted plane, and then the fitted plane is rotated until a normal vector of the fitted plane is in parallel with an axis of the Stokes space, that is, and the polarization demultiplexing may thus be completed. However, the existing method performs calculation by using all the payload symbol points mapped by the received signal to the Poincare sphere, which will cause a problem of blurring of the direction of the normal vector, and an inverse direction of the normal vector will cause exchange of the two states of polarization after the demultiplexing.

It was further found by the inventors that in the existing process of calculating the inverse matrix, only PDL compensation and polarization demultiplexing are taken into account, but residual phase delay compensation is not taken into account, hence, phase noises in the demultiplexed signal will be increased.

Addressed to at least one of the above problems, embodiments of this disclosure provide a state of polarization tracking recovery method and apparatus.

An advantage of the embodiments of this disclosure exists in that in the process of calculating the inverse matrix, PDL compensation is performed before polarization demultiplexing, thereby lowering complexity of calculation.

Another advantage of the embodiments of this disclosure exists in that the direction of the normal vector of the fitted plane may be determined by using the pilot symbols. Hence, the problems of blurring of the direction of the normal vector may be solved, and exchange of the two states of polarization after the demultiplexing will not be resulted.

A further advantage of the embodiments of this disclosure exists in that the residual phase delay is compensated after the polarization demultiplexing, thereby reducing phase noises of the demultiplexed signal.

First Aspect of the Embodiments

The embodiment of this disclosure provides a state of polarization tracking recovery apparatus, configured in an optical receiver end of an optical communication system.

Figure 1B:
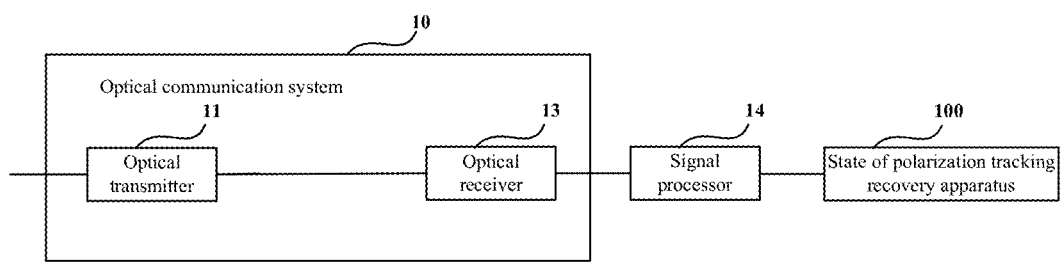

FIGS. 1A and 1B are schematic diagrams of the optical communication system of the embodiment of this disclosure. As shown in FIG. 1A, an optical communication system 10 includes an optical transmitter 11, an optical fiber link 12, an optical receiver 13 and a signal processor 14. A state of polarization tracking recovery apparatus 100 processes a received signal after being performed signal processing to achieve polarization demultiplexing.

In this embodiment, the optical communication system 10 may also be a back-to-back system, that is, as shown in FIG. 1B, the optical communication system 10 may not include the optical fiber link 12, and the optical transmitter 11 and the optical receiver 13 are connected directly.

In this embodiment, the optical transmitter 11, the optical receiver 13 and the signal processor 14 may all use various existing structures, and structures thereof are not limited in the embodiment of this disclosure. For example, the signal processor 14 may include a clock recovery module, a dispersion compensation module, and a receiver IQ imbalance compensation module, which shall not be enumerated herein.

Figure 2A:
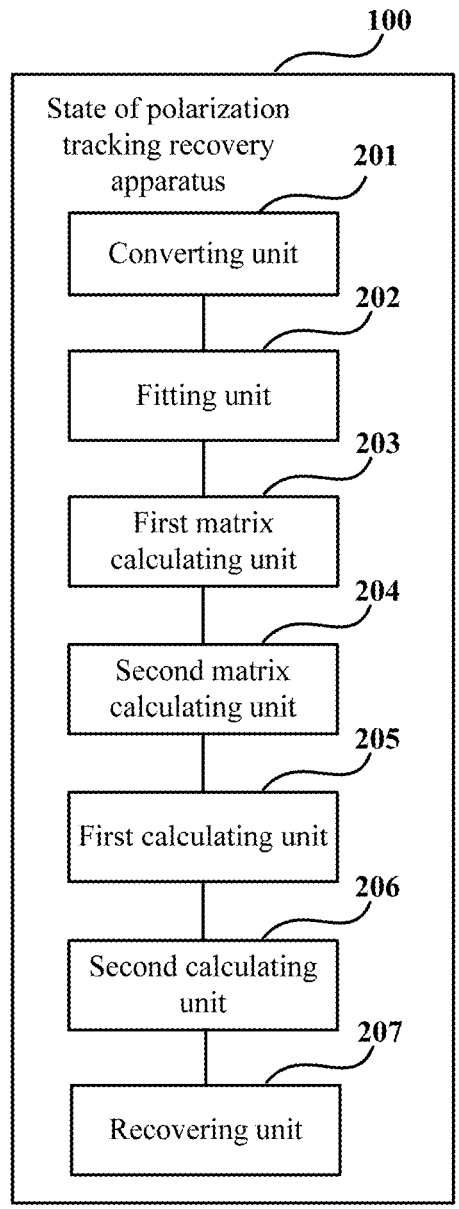
FIGS. 2A and 2B are schematic diagrams of the state of polarization tracking recovery apparatus of an embodiment of this disclosure.

FIG. 2A is a schematic diagrams of the state of polarization tracking recovery apparatus of the embodiment of this disclosure. For example, the state of polarization tracking recovery apparatus is the state of polarization tracking recovery apparatus 100 shown in FIGS. 1A and 1B. As shown in FIG. 2A, the state of polarization tracking recovery apparatus 100 includes:

a converting unit 201 configured to convert Jones vectors constituted by predetermined symbols of two states of polarization in a received dual-polarization multiplexing optical signal into Stokes vectors;

a fitting unit 202 configured to fit the Stokes vectors to which the predetermined symbols correspond on a Poincare sphere to obtain a fitted plane;

a first matrix calculating unit 203 configured to calculate a first compensation matrix used for compensation for polarization-dependent loss (PDL) in a Jones space, wherein the first compensation matrix is calculated by moving a center of the fitted plane to the origin of the Poincare sphere;

a second matrix calculating unit 204 configured to calculate a demultiplexing matrix used for polarization demultiplexing in the Jones space, wherein the demultiplexing matrix is calculated by rotating the fitted plane with the center being moved to the origin until a normal vector of the fitted plane is parallel with a first axis of the Stokes space and rotating the fitted plane with the center being moved to the origin to a plane constituted by a second axis and a third axis of the Stokes space;

a first calculating unit 205 configured to calculate a state of polarization (SOP) first rotation matrix to which the predetermined symbols correspond according to the first compensation matrix and the demultiplexing matrix;

a second calculating unit 206 configured to calculate a state of polarization (SOP) second rotation matrix of the optical received signal at each moment according to the state of polarization (SOP) first rotation matrix to which the predetermined symbols correspond; and a recovering unit 207 configured to multiply a two-dimensional vector constituted by two states of polarization in the optical received signal by the state of polarization (SOP) second rotation matrix to recover optical received signal in two states of polarization in the optical received signal.

Hence, as the demultiplexing matrix used for polarization demultiplexing is calculated by rotating the fitted plane with the center being moved to the origin until the normal vector of the fitted plane is parallel with the first axis of the Stokes space and rotating the fitted plane with the center being moved to the origin to the plane constituted by a second axis and a third axis of the Stokes space, that is, PDL compensation is performed before the polarization demultiplexing, complexity of calculation may be lowered.

In some embodiments, the predetermined symbols used in the converting unit 201 may be pilot symbols and/or payload symbols in the received signal, and this embodiment is not limited thereto. When the predetermined symbols are pilot symbols, they be quadrature phase shift keying QPSK symbol, or other types of modulation symbols, such as binary phase shift keying BPSK symbols, etc., which shall not be enumerated herein any further.

Figure 2B:
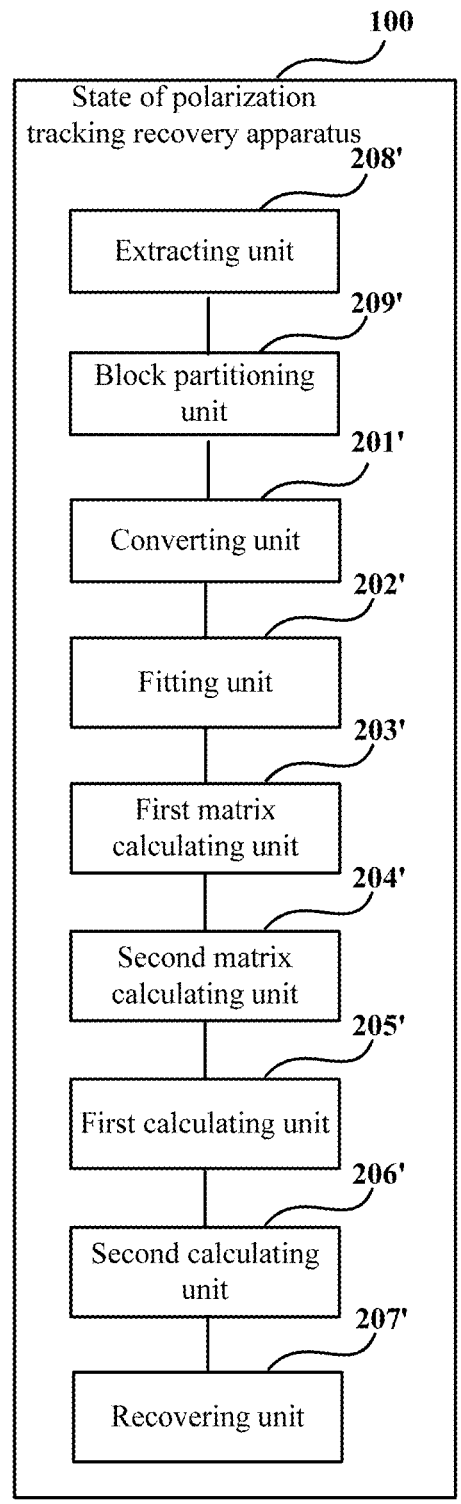

In some embodiments, when the predetermined symbols are QPSK pilot symbols, this embodiment also provides a state of polarization tracking recovery apparatus. FIG. 2B is a schematic diagrams of the state of polarization tracking recovery apparatus of the embodiment of this disclosure. For example, the state of polarization tracking recovery apparatus is the state of polarization tracking recovery apparatus 100 shown in FIGS. 1A and 1B. As shown in FIG. 2B, the state of polarization tracking recovery apparatus 100 includes a converting unit 201', a fitting unit 202', a first matrix calculating unit 203', a second matrix calculating unit 204', a first calculating unit 205', a second calculating unit 206' and a recovering unit 207', implementations of which being similar to implementations of the converting unit 201, fitting unit 202, first matrix calculating unit 203, second matrix calculating unit 204, first calculating unit 205, second calculating unit 206 and recovering unit 207 in FIG. 1A, which shall not be described herein any further.

The apparatus may further include:

an extracting unit 208' configured to extract the predetermined symbols in two states of polarization from the received dual-polarization multiplexing optical signal; and a block partitioning unit 209' configured to partition the predetermined symbols into blocks, each block containing a first predetermined number of symbols.

In some embodiments, the received dual-polarization multiplexing optical signal is the signal processed by the signal processor 14 in FIGS. 1A and 1B, or may be the signal received by the optical receiver 13, this embodiment is not limited thereto. As the pilot symbols are known and are distributed in frame data at a time interval, the extracting unit may extract the pilot symbols according to the known frame structure, and reference may be made to the prior art for a specific method. For example, difference characteristics (such as a peak-to-average power ratio, etc.) of training sequences or pilot symbols and effective payload symbols in the frame structure may be used for positioning and extracting pilot symbols at the two states of polarization in the received dual-polarization multiplexing optical signal, which shall not be described herein any further.

Figure 3:
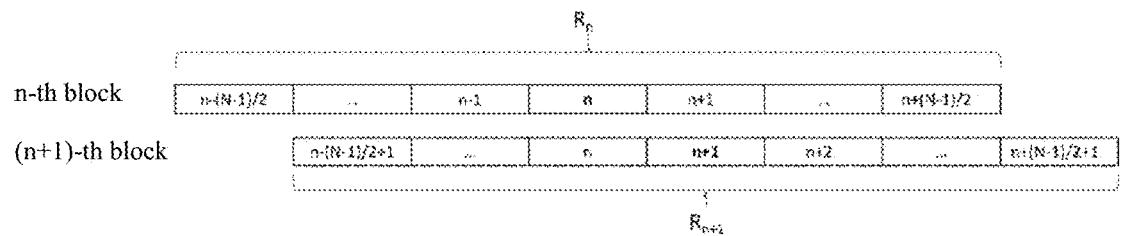
FIG. 3 is a schematic diagram of the block partitioning of the pilot symbols of the embodiment of this disclosure.

In some embodiments, the pilot symbols may be partitioned into blocks. For example, the block partitioning unit 209' partitions chronological symbols into blocks, each block containing a first predetermined number N of symbols, the first predetermined number being dependent on different link conditions and being able to be determined by parameter scanning or empirical values, and this embodiment is not limited thereto. FIG. 3 is a schematic diagram of the block partitioning. As shown in FIG. 3, the first number N of pilot symbols contained in an n-th block include $$\left(n - \frac{N-1}{2}\right)$$

-th pilot symbol to $$\left(n + \frac{N-1}{2}\right)$$

-th pilot symbol, a time window of each block moving in a sliding manner and moving each time by one pilot symbol, that is, the first number N of pilot symbols contained in an (n+1)-th block include $$\left(n - \frac{N-1}{2} + 1\right)$$

-th pilot symbol to $$\left(n + \frac{N-1}{2} + 1\right)$$

-th pilot symbol, and so on, which shall not be enumerated herein any further; wherein both n and N are positive integers.

In some embodiments, the converting unit 201, the fitting unit 202 and the first matrix calculating unit 203 process the pilot symbols in the block by taking a block as a unit, that is, the N pilot symbols in the n-th block are used for estimating a rotation matrix to which an n-th pilot symbol corresponds. It should be noted that the converting unit 201, the fitting unit 202 and the first matrix calculating unit 203 process the blocks in the same way, which shall be described below in detail by taking the n-th block as an example.

In some embodiments, the converting unit 201 converts the Jones vectors constituted by the pilot symbols of two states of polarization in the n-th block in the received dual-polarization multiplexing optical signal into the Stokes vectors; wherein the Jones vector and the Stokes vector are two presentations of polarized light. The Jones vector may be expressed as $|s\rangle = [a_x, a_y e^{i\phi}]^T$; where, $a_x$ and $a_y$ respectively denote amplitudes of two polarization components x and y, and $\phi$ denotes an optical phase difference between the two polarization components x and y. A Stokes vector $\vec{S}_i$ may be obtained by transforming a Jones vector $|s\rangle$ by using the following formula: $\vec{S}_i = \langle s | \vec{\sigma} | s \rangle$; where, i=0, 1, 2, 3, and $|\vec{\sigma}| = (\sigma_0, \sigma_1, \sigma_2, \sigma_3)$ denotes a Pauli spin matrix. Reference may be made to the prior art for details, which shall not be described herein any further.

Figure 4:
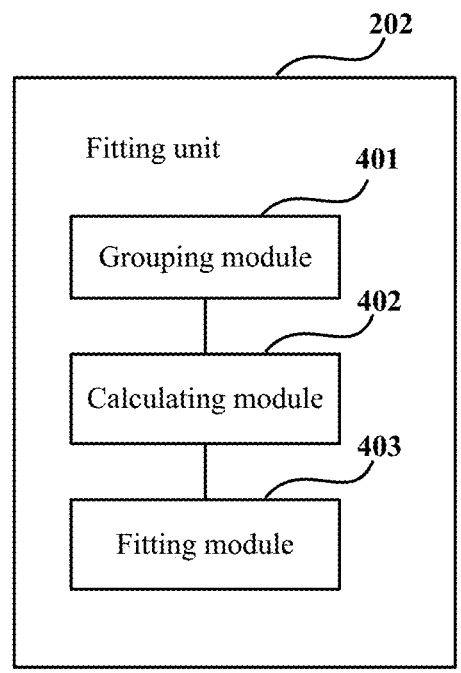
FIG. 4 is a schematic diagram of a structure of the fitting unit of the embodiment of this disclosure.

In some embodiments, the fitting unit 202 fits Stokes vectors to which all pilot symbols in the n-th block correspond on the Poincare sphere to obtain the fitting plane to which each block corresponds. FIG. 4 is a schematic diagram of a structure of the fitting unit 202. As shown in FIG. 4, the fitting unit 202 includes:

a grouping module 401 configured to divide QPSK pilot symbols in each block into groups according to positions of the QPSK pilot symbols in the n-th block on the Poincare sphere;

a calculating module 402 configured to calculate average values of each group to obtain center points; and a fitting module 403 configured to fit the center point of each group to obtain the fitted plane.

Figure 5:
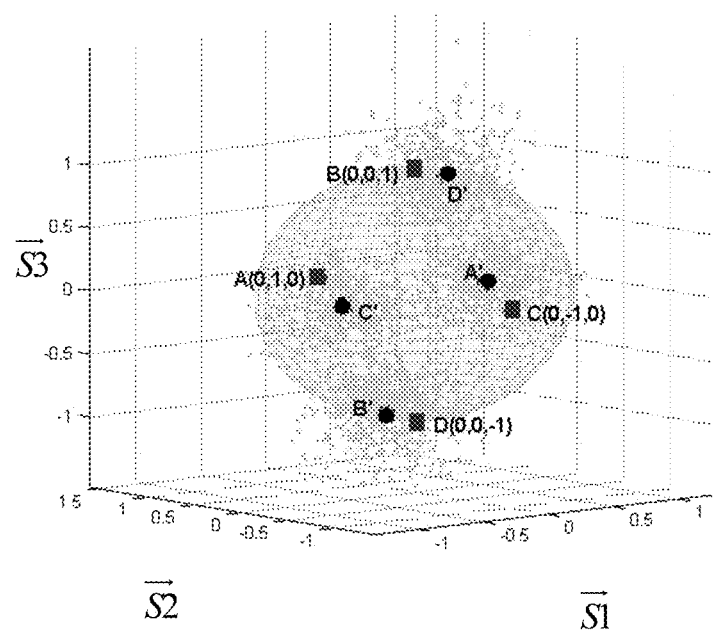
FIG. 5 is a schematic diagram of a state of polarization of the pilot symbols on the Poincare sphere of the embodiment of this disclosure.

In some embodiments, a point on the Poincare sphere denotes a state of polarization. For distortionless QPSK pilot symbols, there are four states of polarization on the Poincare sphere, which are A (0,1,0), B (0,0,1), C (0,−1,0), D (0,0,−1), respectively, which are taken as four reference points. FIG. 5 is a schematic diagram of the Poincare sphere. As shown in FIG. 5, distortionless QPSK pilot symbols are located on an $\vec{S2}$ axis and an $\vec{S3}$ axis, respectively, and the grouping module 401 groups states polarization (positions) of the QPSK pilot symbols in the n-th block extracted by the extracting module 208' on the Poincare sphere, including determining reference points to which the pilot symbols in the n-th block correspond and dividing pilot symbols with identical reference point into one group. As information on the transmitted QPSK pilot symbols is known, after the QPSK pilot symbols are positioned in a frame structure, the reference points to which the pilot symbols correspond may be determined, that is, determining the distortionless QPSK pilot symbols to which the pilot symbols in the received signal correspond and grouping points with identical reference point together. As shown in FIG. 5, the pilot symbols in the n-th block may be divided into 4 groups (4 groups of SOP), and the calculating module 402 calculates average values A', B', C' and D' of the groups and takes them as center points of the groups, and fits A', B', C' and D' to obtain the fitted plane, a center of the fitted plane being an average of the four center points A', B', C' and D'.

In some embodiments, it may be known from the Poincare sphere principle that the PDL effect will cause the center of the fitting plane to deviate from the original point of the Poincare sphere, hence, the first compensation matrix used for compensation for PDL may be calculated by moving the center of the fitted plane to the origin, and the demultiplexing matrix used for polarization demultiplexing may be calculated by rotating the normal vector of the fitted plane to be in parallel with $\vec{S1}$ axis of the Poincare sphere, a principle of which being going to be described herein any further.

Figure 6:
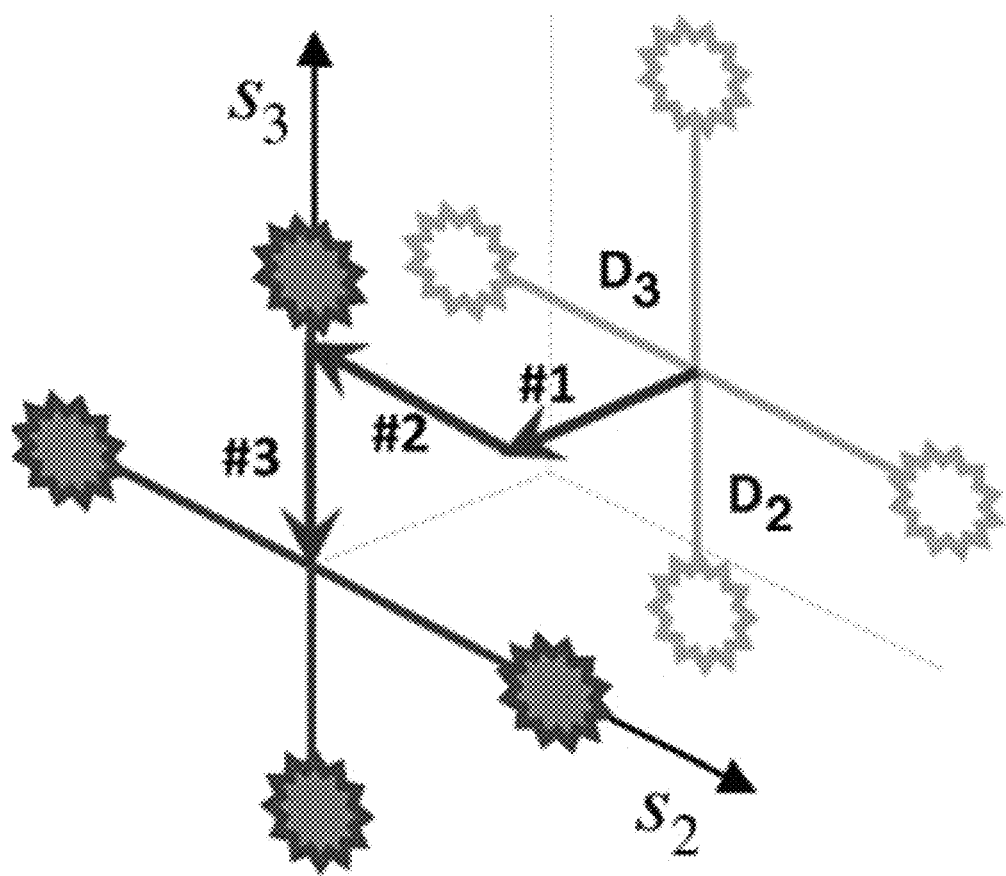
FIG. 6 is a schematic diagram of the PDL compensation process of the embodiment of this disclosure.

In some embodiments, the first matrix calculating unit 203 is configured to calculate the first compensation matrix used for compensation for PDL in the Jones space, wherein the first compensation matrix is calculated by moving the center of the fitted plane to the origin of the Poincare sphere. FIG. 6 is a schematic diagram of moving the center for the PDL compensation. As shown in FIG. 6, a distance d1 of the center moving along $\vec{S1}$ axis may be compensated first, then a distance d2 of the center moving along $\vec{S2}$ axis may be compensated, and finally a distance d3 of the center moving along $\vec{S3}$ axis may be compensated, so that the center coincides with the origin. A formula for calculating the first compensation matrix in the Jones space (a two-dimensional matrix) is as shown in formula 1) below:

$$U_2\left(-\frac{\pi}{2}\right)D(d_3)U_2\left(\frac{\pi}{2}\right)U_3\left(-\frac{\pi}{2}\right)D(d_2)U_3\left(\frac{\pi}{2}\right)D(d_1) \quad \text{formula 1)}$$

$$U_2(\sigma) = \begin{bmatrix} \cos\sigma/2 & i\sin\sigma/2 \\ i\sin\sigma/2 & \cos\sigma/2 \end{bmatrix}, \sigma = \pm\pi/2$$

$$U_3(\chi) = \begin{bmatrix} \cos\chi/2 & \sin\chi/2 \\ \sin\chi/2 & \cos\chi/2 \end{bmatrix}, \chi = \pi/2$$

-continued $$D(x) = \begin{bmatrix} \sqrt{1-x} & 0 \\ 0 & \sqrt{1+x} \end{bmatrix},$$

In some embodiments, after the received signal is multiplied by the first compensation matrix, PDL compensation may be realized.

In some embodiments, the second matrix calculating unit 204 is configured to calculate the demultiplexing matrix used for polarization demultiplexing in the Jones space, wherein the demultiplexing matrix is calculated by rotating the fitted plane with the center being moved to the origin until the normal vector of the fitted plane is parallel with the first axis of the Stokes space and rotating the fitted plane with the center being moved to the origin to the plane constituted by the second axis and the third axis of the Stokes space. Hence, in the embodiment of this disclosure, the center of the fitted plane is moved to the origin first, and then the fitted plane is rotated until its normal vector is parallel with the first axis of the Stokes space and the fitted plane with the center being moved to the origin is rotated to the plane constituted by the second axis and the third axis of the Stokes space, in other words, in this embodiment, after the PDL compensation is completed, the polarization demultiplexing is performed, hence, the number of times of calculating the center of the fitted plane is reduced by one time from twice, and complexity of calculation is lowered, whereas in an existing solution, the polarization demultiplexing is performed first, then the PDL compensation is completed (the center of the fitted plane is calculated for one time, the normal vector of the fitted plane is calculated accordingly, the fitted plane is rotated until its normal vector is parallel with the first axis of the Stokes space (that is, performing polarization demultiplexing), then the center of the fitted plane is calculated again, and the PDL compensation is completed).

In some embodiments, the second matrix calculating unit 204 calculates the normal vector of the fitted plane. For example, all points (states of polarization) of the received dual-polarization multiplexing optical signal on the Poincare sphere may be used to calculate the normal vector of the fitting plane according to a least-squares technique, and an included angle between the normal vector and the first axis is calculated to obtain a rotation axis that rotates the first axis to coincide with the direction of the normal vector, thereby obtaining the demultiplexing matrix.

In some embodiments, in order to avoid a problem of blurring of the normal vector, the second matrix calculating unit 204 may determine the normal vector of the fitted plane according to the pilot symbols. For example, it calculates the normal vector of the fitted plane according to the central points of the above groups (the QPSK pilot symbols are divided into four groups on Poincare sphere), calculates the included angle between the normal vector and the first axis, determines a rotation axis used to rotate the first axis vector to the rotation axis of the normal vector, and calculates the demultiplexing matrix of the polarization multiplexing according to the included angle and the rotation axis.

For example, the determining the normal vector of the fitted plane according to the pilot symbols includes: calculating cross products of vectors from the origin of the Poincare sphere to at least one pair of neighboring center points, and determining the normal vector according to cross product results of at least one pair of vectors, wherein an order of cross product of the at least one pair of neighboring center points is determined according to a counterclockwise order of reference points on the plane constituted by the second axis and the third axis. For example, the central points of the above groups are A', B', C', D' (in the counterclockwise order on the plane formed by the second axis and the third axis), the origin is denoted as O, and cross products $\overrightarrow{OA'} \times \overrightarrow{OB'}$ or $\overrightarrow{OB'} \times \overrightarrow{OC'}$ or $\overrightarrow{OC'} \times \overrightarrow{OD'}$ or $\overrightarrow{OD'} \times \overrightarrow{OA'}$ is calculated according to vectors, and the normal vector is determined according to at least one pair of cross product results. For example, one pair of cross product result or an average value of at least two pairs of cross product results may be normalized to obtain a normal vector $\vec{n}$ with no direction blurring; an included angle $\alpha$ between the normal vector $\vec{n}$ and the axis $\vec{S1}$ is calculated, a cross product $\vec{S1} \times \vec{n}$ of the first axis vector and the normal vector is calculated, the normalized result is determined as the rotation axis vector $\vec{r}$, and the demultiplexing matrix of the Jones space (two-dimensional matrix) polarization demultiplexing may be calculated according to $\alpha$ and $\vec{r}$. Reference may be made to formula 2) below for details.

$$U = \left(\cos\left(\frac{\alpha}{2}\right)I - j \times \sin\left(\frac{\alpha}{2}\right)\right)(\vec{r} \times \sigma); \quad \text{formula 2)}$$

where, $\vec{r} \times \sigma = \vec{r}(1) \times \sigma_1 + \vec{r}(2) \times \sigma_2 + \vec{r}(3) \times \sigma_3$, $(\sigma_1, \sigma_2, \sigma_3)$ come from the above Pauli spin matrix, I denotes a unit matrix, and $\vec{r}(1)$, $\vec{r}(2)$ and $\vec{r}(3)$ denote three components of a unit vector $\vec{r}$.

In some embodiments, the first calculating unit 205 calculates the SOP first rotation matrix to which the predetermined symbols correspond according to the first compensation matrix J1 and the demultiplexing matrix J2. For example, a result of J2×J1 is taken as an SOP first rotation matrix to which the n-th pilot symbol corresponds.

Processing of the pilot symbols in the n-th block by the converting unit 201, the fitting unit 202 and the first matrix calculating unit 203 by taking a block as a unit is described above by way of examples. And the converting unit 201, the fitting unit 202 and the first matrix calculating unit 203 performs similar processing on the pilot symbols in each block in turn, thereby obtaining the SOP first rotation matrix corresponding to each pilot symbol.

In some embodiments, the second calculating unit 206 calculates the SOP second rotation matrix of the optical received signal at different moments according to the SOP first rotation matrix to which the predetermined symbols (such as the pilot symbols) correspond. For example, an SOP third rotation matrix to which non-pilot symbols (such as load symbols) of the optical received signal correspond is calculated by using an interpolation algorithm (such as linear interpolation, etc.), and the SOP first rotation matrix and the SOP third rotation matrix are merged to form the SOP second rotation matrix of the optical received signal at different moments. For example, the pilot symbols correspond to the SOP first rotation matrices X, and interpolation is performed on first elements X(1,1) of these matrices to obtain first elements Y(1,1) of SOP third rotation matrices Y to which the non-pilot symbols correspond, and so on, which shall not be described herein any further.

In some embodiments, the recovering unit 207 multiplies the two-dimensional vector constituted by two states of polarization in the optical received signal by the SOP second rotation matrix to recover optical received signal in two states of polarization in the optical received signal.

It can be seen from the above embodiment that as the demultiplexing matrix used for polarization demultiplexing is calculated by rotating the fitted plane with the center being moved to the origin until the normal vector of the fitted plane is parallel with the first axis of the Stokes space and rotating the fitted plane to the plane constituted by a second axis and a third axis of the Stokes space, that is, PDL compensation is performed before the polarization demultiplexing, complexity of calculation may be lowered.

Second Aspect of the Embodiments

The embodiment of this disclosure provides a state of polarization tracking recovery apparatus, configured in an optical receiver end of an optical communication system. This embodiment is different from the first aspect of the embodiments in that phase compensation is performed after polarization demultiplexing.

Figure 7:
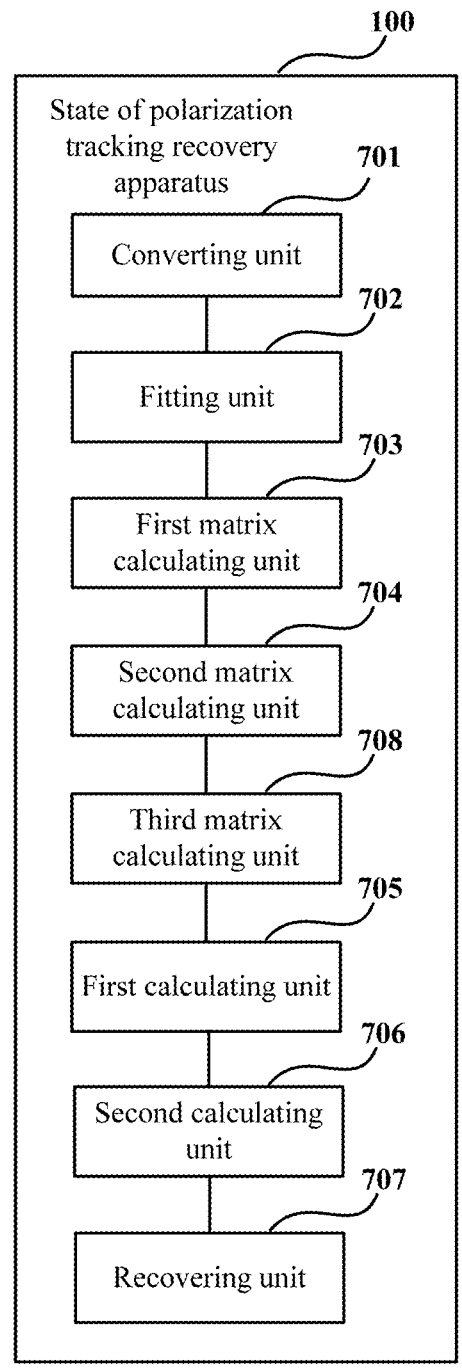
FIG. 7 is a schematic diagram of the state of polarization tracking recovery apparatus of an embodiment of this disclosure.

FIG. 7 is a schematic diagram of the state of polarization tracking recovery apparatus of the embodiment of this disclosure. For example, the state of polarization tracking recovery apparatus is the state of polarization tracking recovery apparatus 100 shown in FIGS. 1A and 1B. As shown in FIG. 7, the state of polarization tracking recovery apparatus 100 includes a converting unit 701, a fitting unit 702, a first matrix calculating unit 703, a second matrix calculating unit 704, a second calculating unit 706 and a recovering unit 707, implementations of which being similar to implementations of the converting unit 201, fitting unit 202, first matrix calculating unit 203, second matrix calculating unit 204, second calculating unit 206 and recovering unit 207 in the first aspect of the embodiments, which shall not be described herein any further.

In some embodiments, the state of polarization tracking recovery apparatus 100 may further include an extracting unit (optional, not shown) and a block partitioning unit (optional, not shown). Reference may be made to the first aspect of the embodiments for implementations of these units, which shall not be described herein any further.

In some embodiments, as shown in FIG. 7, the state of polarization tracking recovery apparatus 100 may further include:

a third matrix calculating unit 708 configured to calculate a second compensation matrix used for compensation for phase in the Jones space; and a first calculating unit 705 configured to calculate the SOP first rotation matrix to which the predetermined symbols correspond according to the first compensation matrix, the demultiplexing matrix and the second compensation matrix.

In some embodiments, after the PDL compensation and polarization demultiplexing, the fitted plane is rotated back to the plane formed by the $\vec{S2}$ axis and the $\vec{S3}$ axis; wherein the second compensation matrix may be calculated by continuing to rotate the fitted plane that has been rotated to the plane constituted by the second axis and the third axis until the central points of the groups (the QPSK pilot symbols are divided into 4 groups on the Poincare sphere) coincide with respective reference points. For example, the third matrix calculating unit 708 determines a rotation angle according to included angles between central points of the groups and the reference points, and calculates the second compensation matrix of the phase compensation in a Jones space (two-dimensional matrix) according to the rotation angle and a rotation axis; wherein the rotation axis is the first axis, and reference may be made to formula 2) for details, which shall not be described herein any further.

In some embodiments, the first calculating unit 705 calculates SOP first rotation matrices to which the predetermined symbols correspond according to the first compensation matrix J1, the demultiplexing matrix J2 and the second compensation matrix J3, such as taking a result of J3×J2×J1 as the SOP first rotation matrix of to which an n-th pilot symbol corresponds.

It can be seen from the above that in this embodiment, after the PDL compensation is completed, the polarization demultiplexing and phase delay compensation are performed, hence, the number of times of calculating the center of the fitted plane is reduced from three times to one time and complexity of calculation is lowered in comparison with the case where the polarization demultiplexing and phase delay compensation are performed first, then the PDL compensation is completed (the center of the fitted plane is calculated for one time, the normal vector of the fitted plane is calculated accordingly, the fitted plane is rotated until its normal vector is parallel with the first axis of the Stokes space (that is, performing polarization demultiplexing), the center of the fitted plane is calculated again, compensation for residual phase delay between two states of polarization is performed, and then the center of the fitted plane is calculated again and PDL compensation is performed). And furthermore, as compensation for residual phase delay is performed after the polarization demultiplexing, phase noises in the demultiplexed signal may be reduced.

Third Aspect of the Embodiments

The embodiment of this disclosure provides a state of polarization tracking recovery apparatus, configured in an optical receiver end of an optical communication system. This embodiment is different from the first aspect of the embodiments in that a predetermined symbol is a pilot symbol, a demultiplexing matrix of polarization multiplexing in a Jones space is calculated according to the pilot symbol, and an order of execution of PDL compensation and polarization multiplexing is not limited.

Figure 8:
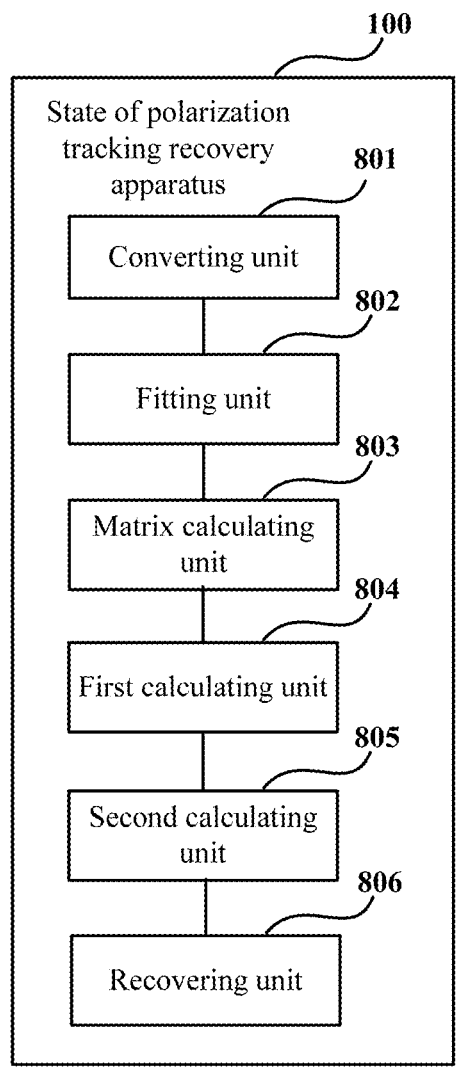
FIG. 8 is a schematic diagram of the state of polarization tracking recovery apparatus of an embodiment of this disclosure.

FIG. 8 is a schematic diagram of the state of polarization tracking recovery apparatus of the embodiment of this disclosure. For example, the state of polarization tracking recovery apparatus is the state of polarization tracking recovery apparatus 100 shown in FIGS. 1A and 1B. As shown in FIG. 8, the state of polarization tracking recovery apparatus 100 includes:

a converting unit 801 configured to convert Jones vectors constituted by pilot symbols of two states of polarization in a received dual-polarization multiplexing optical signal into Stokes vectors;

a fitting unit 802 configured to fit the Stokes vectors to which the pilot symbols correspond on a Poincare sphere to obtain a fitted plane;

a matrix calculating unit 803 configured to calculate a first compensation matrix used for compensation for polarization-dependent loss (PDL) in a Jones space, and calculate a demultiplexing matrix used for polarization demultiplexing in the Jones space according to the pilot symbols, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space;

a first calculating unit 804 configured to calculate a state of polarization (SOP) first rotation matrix to which the pilot symbols correspond according to the first compensation matrix and the demultiplexing matrix;

a second calculating unit 805 configured to calculate a state of polarization (SOP) second rotation matrix of the optical received signal at each moment according to the state of polarization (SOP) first rotation matrix to which the pilot symbols correspond; and a recovering unit 806 configured to multiply a two-dimensional vector constituted by two states of polarization in the optical received signal by the state of polarization (SOP) second rotation matrix to recover optical received signals in two states of polarization in the optical received signal.

In some embodiments, reference may be made to implementations of the converting unit 201, fitting unit 202, first calculating unit 205, second calculating unit 206 and recovering unit 207 in the first aspect of the embodiments in the case where the predetermined symbol is a pilot symbol for implementations of the converting unit 801, fitting unit 802, first calculating unit 804, second calculating unit 805 and recovering unit 806, which shall not be described herein any further.

In some embodiments, the state of polarization tracking recovery apparatus 100 may further include an extracting unit (optional, not shown) and a block partitioning unit (optional, not shown). Reference may be made to the first aspect of the embodiments for implementations of these units, which shall not be described herein any further.

In some embodiments, the matrix calculating unit 803 calculates the first compensation matrix used for compensation for polarization-dependent loss PDL in the Jones space, and calculates the demultiplexing matrix used for polarization demultiplexing in the Jones space according to the pilot symbols. For example, compensation for PDL is performed first, and then polarization demultiplexing is performed, that is, the first compensation matrix is obtained first by moving the center of the fitted plane to the origin of the Poincare sphere, and then the demultiplexing matrix is obtained by rotating the fitted plane with the center being moved to the origin until the normal vector thereof is parallel with the first axis of the Stokes space and rotating the fitted plane with the center being moved to the origin to the plane constituted by the second axis and the third axis of the Stokes space, and reference may be made to the first aspect of the embodiments. Alternatively, polarization demultiplexing may be performed first, and then compensation for PDL is performed, that is, the demultiplexing matrix is obtained by rotating the fitted plane until the normal vector thereof is parallel with the first axis of the Stokes space and rotating the fitted plane to the plane constituted by the second axis and the third axis of the Stokes space, and then the first compensation matrix is obtained by moving the center of the rotated fitted plane to the origin of the Poincare sphere, which shall not be described herein any further.

It can be seen from the above embodiment that the direction of the normal vector of the fitted plane may be determined by using the pilot symbols, which solves the problem of blurring of the direction of the normal vector in polarization demultiplexing and will not cause exchange of the two states of polarization after demultiplexing.

Fourth Aspect of the Embodiments

The embodiment of this disclosure provides a state of polarization tracking recovery apparatus, configured in an optical receiver end of an optical communication system. This embodiment is different from the third aspect of the embodiments in that phase compensation is performed after polarization demultiplexing.

Figure 9:
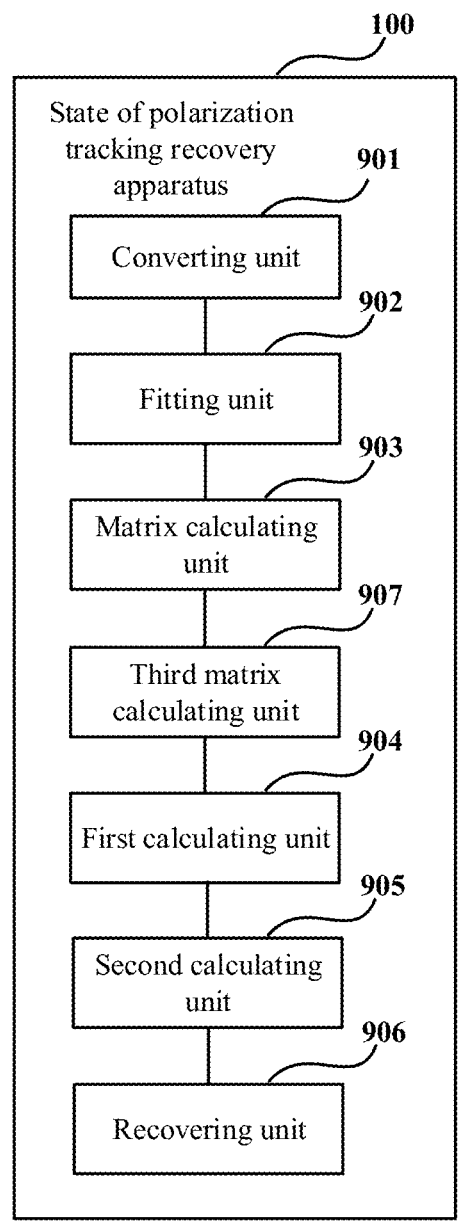
FIG. 9 is a schematic diagram of the state of polarization tracking recovery apparatus of an embodiment of this disclosure.

FIG. 9 is a schematic diagram of the state of polarization tracking recovery apparatus of the embodiment of this disclosure. For example, the state of polarization tracking recovery apparatus is the state of polarization tracking recovery apparatus 100 shown in FIGS. 1A and 1B. As shown in FIG. 9, the state of polarization tracking recovery apparatus 100 includes a converting unit 901, a fitting unit 902, a matrix calculating unit 903, a second calculating unit 905 and a recovering unit 906, implementations of which being identical to implementations of the converting unit 801, fitting unit 802, matrix calculating unit 803, second calculating unit 805 and recovering unit 806 in the third aspect of the embodiments, which shall not be described herein any further.

In some embodiments, the state of polarization tracking recovery apparatus 100 may further include an extracting unit (optional, not shown) and a block partitioning unit (optional, not shown). Reference may be made to the first aspect of the embodiments for implementations of these units, which shall not be described herein any further.

In some embodiments, as shown in FIG. 9, the state of polarization tracking recovery apparatus 100 may further include:

a third matrix calculating unit 907 configured to calculate a second compensation matrix used for compensation for phase in the Jones space; and a first calculating unit 904 configured to calculate the SOP first rotation matrix to which the pilot symbols correspond according to the first compensation matrix, the demultiplexing matrix and the second compensation matrix.

In some embodiments, reference may be made to implementations of the third matrix calculating unit 708 and the first calculating unit 705 in the second aspect of the embodiments for implementations of the third matrix calculating unit 907 and the first calculating unit 904, which shall not be described herein any further.

It can be seen from the above embodiment that the direction of the normal vector of the fitted plane may be determined by using the pilot symbols, which solves the problem of blurring of the direction of the normal vector in polarization demultiplexing and will not cause exchange of the two states of polarization after demultiplexing. And furthermore, as compensation for residual phase delay is performed after the polarization demultiplexing, phase noises in the demultiplexed signal may be reduced.

Fifth Aspect of the Embodiments

The embodiment of this disclosure provides a state of polarization tracking recovery apparatus, configured in an optical receiver end of an optical communication system. This embodiment is different from the first aspect of the embodiments in that compensation for phase is performed after polarization demultiplexing, and an order of execution of PDL compensation and polarization multiplexing is not limited.

Figure 10:
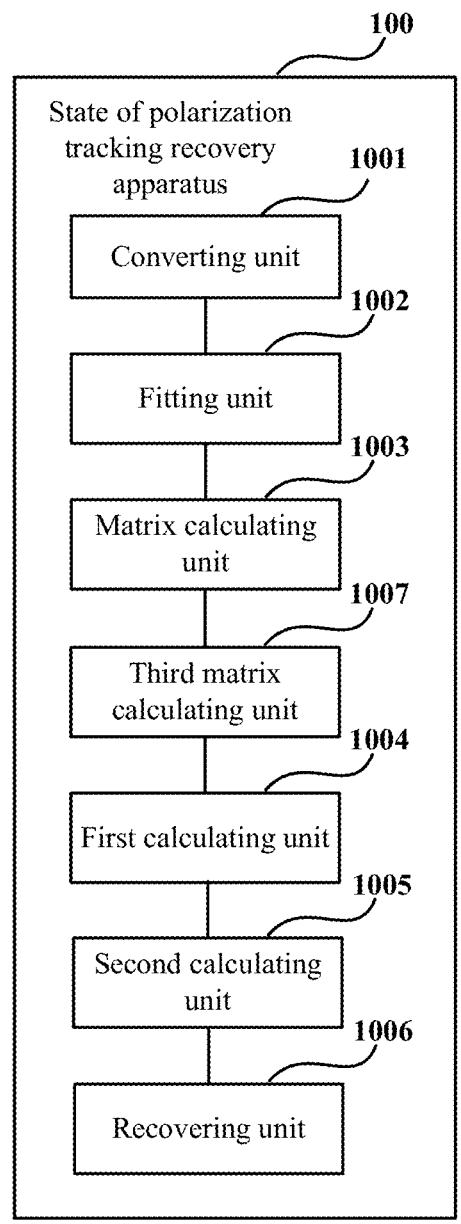
FIG. 10 is a schematic diagram of the state of polarization tracking recovery apparatus of an embodiment of this disclosure.

FIG. 10 is a schematic diagram of the state of polarization tracking recovery apparatus of the embodiment of this disclosure. For example, the state of polarization tracking recovery apparatus is the state of polarization tracking recovery apparatus 100 shown in FIGS. 1A and 1B. As shown in FIG. 10, the state of polarization tracking recovery apparatus 100 includes:

a converting unit 1001 configured to convert Jones vectors constituted by predetermined symbols of two states of polarization in a received dual-polarization multiplexing optical signal into Stokes vectors;

a fitting unit 1002 configured to fit the Stokes vectors to which the predetermined symbols correspond on a Poincare sphere to obtain a fitted plane;

a matrix calculating unit 1003 configured to calculate a first compensation matrix used for compensation for polarization-dependent loss (PDL) in a Jones space, and calculate a demultiplexing matrix used for polarization demultiplexing in the Jones space, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space;

a third matrix calculating unit 1007 configured to calculate a second compensation matrix used for compensation for phase in the Jones space;

a first calculating unit 1004 configured to calculate an SOP first rotation matrix to which the predetermined symbols correspond according to the first compensation matrix, the demultiplexing matrix and the second compensation matrix;

a second calculating unit 1005 configured to calculate an SOP second rotation matrix of the optical received signal at each moment according to the SOP first rotation matrix to which the predetermined symbols correspond; and a recovering unit 1006 configured to multiply a two-dimensional vector constituted by two states of polarization in the optical received signal by the SOP second rotation matrix to recover optical received signals in two states of polarization in the optical received signal.

In some embodiments, reference may be made to implementations of the converting unit 201, fitting unit 202, second calculating unit 206 and recovering unit 207 in the first aspect of the embodiments for implementations of the converting unit 1001, fitting unit 1002, second calculating unit 1005 and recovering unit 1006, which shall not be described herein any further.

In some embodiments, reference may be made to implementation of the calculating unit 803 in the third aspect of the embodiments for implementation of the calculating unit 1003, which shall not be described herein any further.

In some embodiments, reference may be made to implementations of the third matrix calculating unit 708 and the first calculating unit 705 in the second aspect of the embodiments for implementation of the third matrix calculating unit 1007 and the first calculating unit 1004, which shall not be described herein any further.

In some embodiments, the state of polarization tracking recovery apparatus 100 may further include an extracting unit (optional, not shown) and a block partitioning unit (optional, not shown). Reference may be made to the first aspect of the embodiments for implementations of these units, which shall not be described herein any further.

It can be seen from the above embodiment that compensation for residual phase delay is performed after the polarization demultiplexing, hence, phase noises in the demultiplexed signal may be reduced.

Sixth Aspect of the Embodiments

The embodiment of this disclosure provides an electronic device (not shown), including a state of polarization tracking recovery apparatus 100, a structure and functions of which being identical to those contained in the first to sixth aspects of the embodiments, and being not going to be described herein any further.

Figure 11:
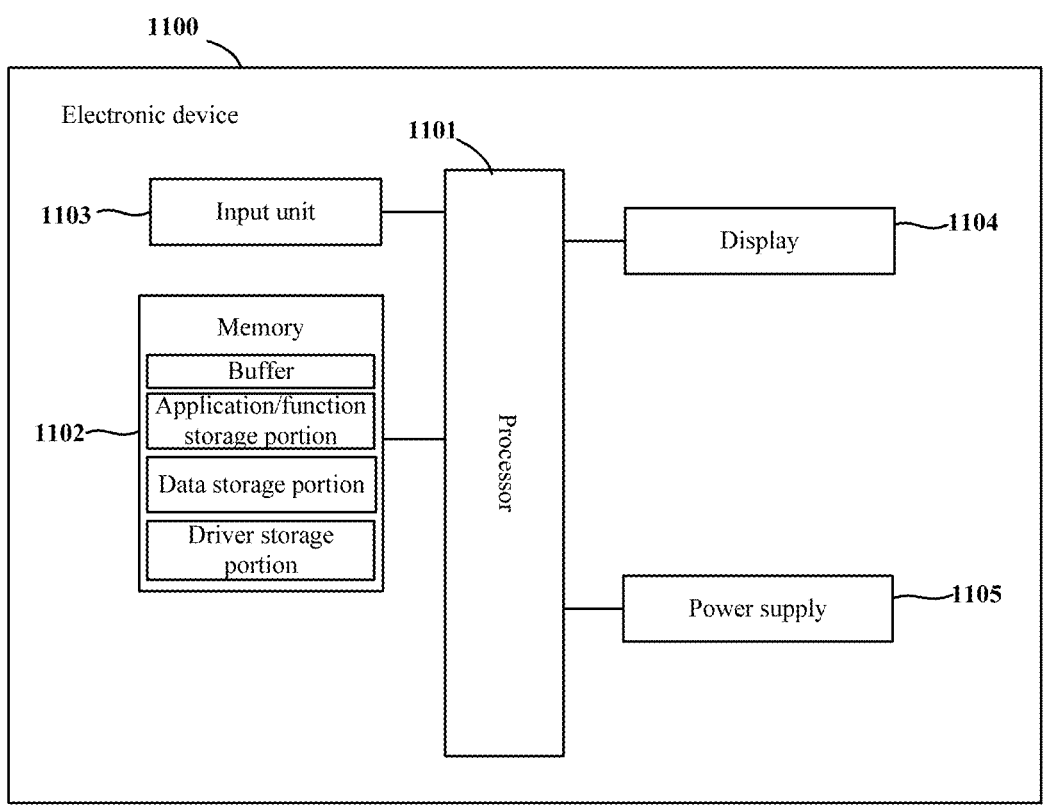
FIG. 11 is a schematic diagram of the electronic device of an embodiment of this disclosure.

The embodiment of this disclosure further provides an electronic device. FIG. 11 is a schematic diagram of a systematic diagram of the electronic device of the embodiment of this disclosure. As shown in FIG. 11, an electronic device 1100 may include a processor 1101 and a memory 1102, the memory 1102 being coupled to the processor 1101. This figure is illustrative only, and other types of structures may also be used, so as to supplement or replace this structure and achieve a telecommunications function or other functions.

As shown in FIG. 11, the electronic device 1100 may further include an input unit 1103, a display 1104, and a power supply 1105, etc.

In some embodiments, the functions of the state of polarization tracking recovery apparatus of the first aspect may be integrated into the processor 1101. The processor 1101 may be configured to: convert Jones vectors constituted by predetermined symbols of two states of polarization in a received dual-polarization multiplexing optical signal into Stokes vectors; fit the Stokes vectors to which the predetermined symbols correspond on a Poincare sphere to obtain a fitted plane; calculate a first compensation matrix used for compensation for PDL in a Jones space, wherein the first compensation matrix is calculated by moving a center of the fitted plane to the origin of the Poincare sphere; calculate a demultiplexing matrix used for polarization demultiplexing in the Jones space, wherein the demultiplexing matrix is calculated by rotating the fitted plane with the center being moved to the origin until a normal vector of the fitted plane is parallel with a first axis of the Stokes space and rotating the fitted plane with the center being moved to the origin to a plane constituted by a second axis and a third axis of the Stokes space; calculate an SOP first rotation matrix to which the predetermined symbols correspond according to the first compensation matrix and the demultiplexing matrix; calculate an SOP second rotation matrix of the optical received signal at each moment according to the SOP first rotation matrix to which the predetermined symbols correspond; and multiply a two-dimensional vector constituted by two states of polarization in the optical received signal by the SOP second rotation matrix to recover optical received signal in two states of polarization in the optical received signal.

In some embodiments, the functions of the state of polarization tracking recovery apparatus of the second aspect may be integrated into the processor 1101. The processor 1101 may be configured to: convert Jones vectors constituted by predetermined symbols of two states of polarization in a received dual-polarization multiplexing optical signal into Stokes vectors; fit the Stokes vectors to which the predetermined symbols correspond on a Poincare sphere to obtain a fitted plane; calculate a first compensation matrix used for compensation for PDL in a Jones space, and calculate a demultiplexing matrix used for polarization demultiplexing in the Jones space, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space; calculate a second compensation matrix used for compensation for phase in the Jones space; calculate an SOP first rotation matrix to which the predetermined symbols correspond according to the first compensation matrix, the demultiplexing matrix and the second compensation matrix; calculate an SOP second rotation matrix of the optical received signal at each moment according to the SOP first rotation matrix to which the predetermined symbols correspond; and multiply a two-dimensional vector constituted by two states of polarization in the optical received signal by the SOP second rotation matrix to recover optical received signals in two states of polarization in the optical received signal.

In some embodiments, the functions of the state of polarization tracking recovery apparatus of the third aspect may be integrated into the processor 1101. The processor 1101 may be configured to: convert Jones vectors constituted by pilot symbols in two states of polarization in a received dual-polarization multiplexing optical signal into Stokes vectors; fit the Stokes vectors to which the pilot symbols correspond on a Poincare sphere to obtain a fitted plane; calculate a first compensation matrix used for compensation for PDL in a Jones space, and calculate a demultiplexing matrix used for polarization demultiplexing in the Jones space according to the pilot symbols, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space; calculate an SOP first rotation matrix to which the pilot symbols correspond according to the first compensation matrix and the demultiplexing matrix; calculate an SOP second rotation matrix of the optical received signal at each moment according to the SOP first rotation matrix to which the pilot symbols correspond; and multiply a two-dimensional vector constituted by two states of polarization in the optical received signal by the SOP second rotation matrix to recover optical received signals in two states of polarization in the optical received signal.

In some embodiments, the functions of the state of polarization tracking recovery apparatus of the fourth aspect may be integrated into the processor 1101. The processor 1101 may be configured to: convert Jones vectors constituted by pilot symbols of two states of polarization in a received dual-polarization multiplexing optical signal into Stokes vectors; fit the Stokes vectors to which the pilot symbols correspond on a Poincare sphere to obtain a fitted plane; calculate a first compensation matrix used for compensation for PDL in a Jones space, and calculate a demultiplexing matrix used for polarization demultiplexing in the Jones space according to the pilot symbols, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space; calculate a second compensation matrix used for compensation for phase in the Jones space; calculate the SOP first rotation matrix to which the pilot symbols correspond according to the first compensation matrix, the demultiplexing matrix and the second compensation matrix; calculate an SOP second rotation matrix of the optical received signal at each moment according to the SOP first rotation matrix to which the pilot symbols correspond; and multiply a two-dimensional vector constituted by two states of polarization in the optical received signal by the SOP second rotation matrix to recover optical received signals in two states of polarization in the optical received signal.

In some embodiments, the functions of the state of polarization tracking recovery apparatus of the fifth aspect may be integrated into the processor 1101. The processor 1101 may be configured to: convert Jones vectors constituted by predetermined symbols of two states of polarization in a received dual-polarization multiplexing optical signal into Stokes vectors; fit the Stokes vectors to which the predetermined symbols correspond on a Poincare sphere to obtain a fitted plane; calculate a first compensation matrix used for compensation for PDL in a Jones space, and calculate a demultiplexing matrix used for polarization demultiplexing in the Jones space, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space; calculate a second compensation matrix used for compensation for phase in the Jones space; calculate an SOP first rotation matrix to which the predetermined symbols correspond according to the first compensation matrix, the demultiplexing matrix and the second compensation matrix; calculate an SOP second rotation matrix of the optical received signal at each moment according to the SOP first rotation matrix to which the predetermined symbols correspond; and multiply a two-dimensional vector constituted by two states of polarization in the optical received signal by the SOP second rotation matrix to recover optical received signals in two states of polarization in the optical received signal.

In another implementation, the state of polarization tracking recovery apparatuses described in the first to fifth aspect and the processor 1101 may be configured separately. For example, the state of polarization tracking recovery apparatuses may be configured as chips connected to the processor 1101, and the functions of the state of polarization tracking recovery apparatuses are executed under control of the processor 1101.

In this embodiment, the electronic device 1100 does not necessarily include all the parts shown in FIG. 11.

As shown in FIG. 11, the processor 1101 is sometimes referred to as a controller or an operational control, which may include a microprocessor or other processor devices and/or logic devices. The processor 1101 receives input and controls operations of components of the electronic device 1100.

The memory 1102 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1101 may execute programs stored in the memory 1102, so as to realize information storage or processing, etc. Functions of other parts are similar to those of the prior art, which shall not be described herein any further. The parts of the electronic device 1100 may be realized by specific hardware, firmware, software, or any combination thereof, without departing from the scope of this disclosure.

In this embodiment, the electronic device 1100 may be of a separate device, such as a separate computer, or may be integrated into an optical receiver.

It can be seen from the above embodiment that as the demultiplexing matrix used for polarization demultiplexing is calculated by rotating the fitted plane with the center being moved to the origin until the normal vector of the fitted plane is parallel with the first axis of the Stokes space and rotating the fitted plane with the center being moved to the origin to the plane constituted by a second axis and a third axis of the Stokes space, that is, PDL compensation is performed before the polarization demultiplexing, complexity of calculation may be lowered. Furthermore, the direction of the normal vector of the fitted plane may be determined by using the pilot symbols. Hence, the problems of blurring of the direction of the normal vector may be solved, and exchange of the two states of polarization after the demultiplexing will not be resulted. Moreover, as compensation for residual phase delay is performed after the polarization demultiplexing, phase noises in the demultiplexed signal may be reduced.

Seventh Aspect of the Embodiments

The embodiment of this disclosure provides a state of polarization tracking recovery method, corresponding to the state of polarization tracking recovery apparatuses in the first to fifth aspects.

Figure 12:
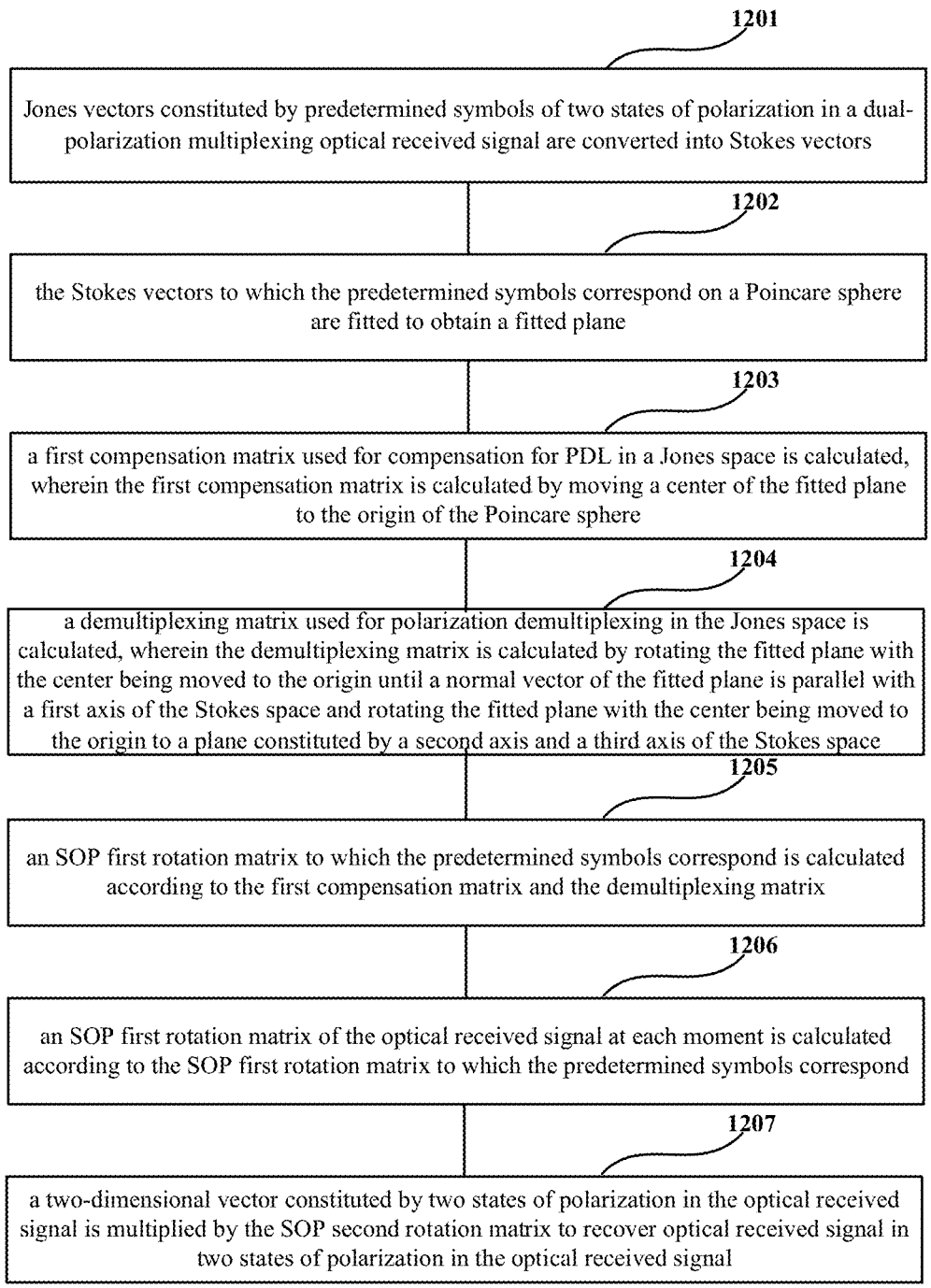
FIG. 12 is a schematic diagram of the state of polarization tracking recovery method of an embodiment of this disclosure.

FIG. 12 is a schematic diagram of the state of polarization tracking recovery method of the embodiment of this disclosure, corresponding to the state of polarization tracking recovery apparatuses in the first and second aspects. As shown in FIG. 12, the method includes:

operation 1201: Jones vectors constituted by predetermined symbols of two states of polarization in a received dual-polarization multiplexing optical signal are converted into Stokes vectors;

operation 1202: the Stokes vectors to which the predetermined symbols correspond on a Poincare sphere are fitted to obtain a fitted plane;

operation 1203: a first compensation matrix used for compensation for PDL in a Jones space is calculated, wherein the first compensation matrix is calculated by moving a center of the fitted plane to the origin of the Poincare sphere;

operation 1204: a demultiplexing matrix used for polarization demultiplexing in the Jones space is calculated, wherein the demultiplexing matrix is calculated by rotating the fitted plane with the center being moved to the origin until a normal vector of the fitted plane is parallel with a first axis of the Stokes space and rotating the fitted plane with the center being moved to the origin to a plane constituted by a second axis and a third axis of the Stokes space;

operation 1205: an SOP first rotation matrix to which the predetermined symbols correspond is calculated according to the first compensation matrix and the demultiplexing matrix;

operation 1206: an SOP second rotation matrix of the optical received signal at each moment is calculated according to the SOP first rotation matrix to which the predetermined symbols correspond; and operation 1207: a two-dimensional vector constituted by two states of polarization in the optical received signal is multiplied by the SOP second rotation matrix to recover optical received signal in two states of polarization in the optical received signal.

In some embodiments, the method may further include (not shown): a second compensation matrix used for compensation for phase in the Jones space is calculated after operation 1204. Reference may be made to the second aspect of the embodiments for a calculation method of the second compensation matrix, which shall not be described herein any further. And in operation 1205, the SOP first rotation matrix to which the predetermined symbols correspond is calculated according to the first compensation matrix, the demultiplexing matrix and the second compensation matrix.

Figure 13:
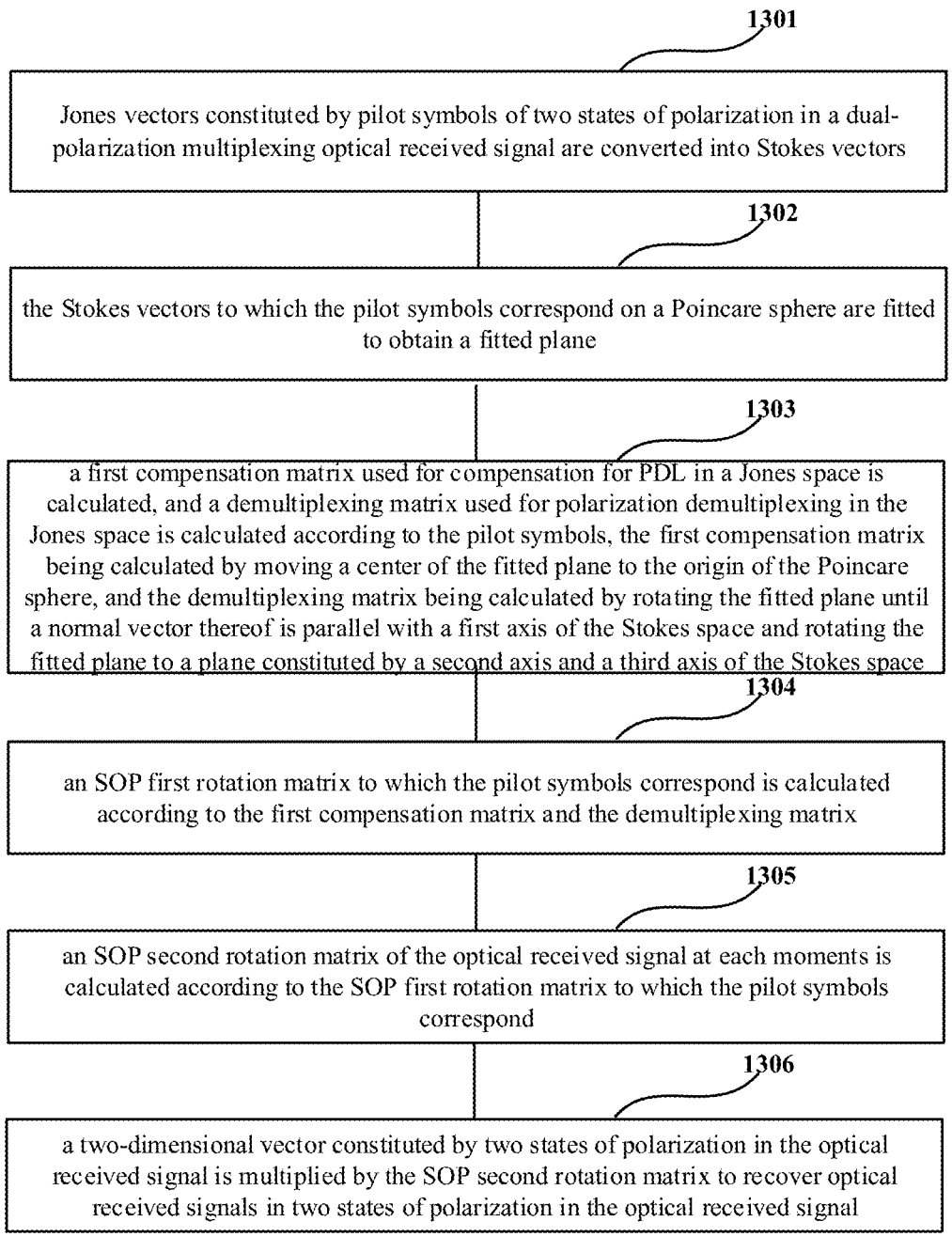
FIG. 13 is a schematic diagram of the state of polarization tracking recovery method of an embodiment of this disclosure.

FIG. 13 is a schematic diagram of the state of polarization tracking recovery method of the embodiment of this disclosure, corresponding to the third and fourth aspects of the embodiments. As shown in FIG. 13, the method includes:

operation 1301: Jones vectors constituted by pilot symbols of two states of polarization in a received dual-polarization multiplexing optical signal are converted into Stokes vectors;

operation 1302: the Stokes vectors to which the pilot symbols correspond on a Poincare sphere are fitted to obtain a fitted plane;

operation 1303: a first compensation matrix used for compensation for PDL in a Jones space is calculated, and a demultiplexing matrix used for polarization demultiplexing in the Jones space is calculated according to the pilot symbols, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space;

operation 1304: an SOP first rotation matrix to which the pilot symbols correspond is calculated according to the first compensation matrix and the demultiplexing matrix;

operation 1305: an SOP second rotation matrix of the optical received signal at each moments is calculated according to the SOP first rotation matrix to which the pilot symbols correspond; and operation 1306: a two-dimensional vector constituted by two states of polarization in the optical received signal is multiplied by the SOP second rotation matrix to recover optical received signals in two states of polarization in the optical received signal.

In some embodiments, the method may further include (not shown): a second compensation matrix used for compensation for phase in the Jones space is calculated after operation 1303. Reference may be made to the second aspect of the embodiments for a calculation method of the second compensation matrix, which shall not be described herein any further. And in operation 1304, the SOP first rotation matrix to which the pilot symbols correspond is calculated according to the first compensation matrix, the demultiplexing matrix and the second compensation matrix.

Figure 14:
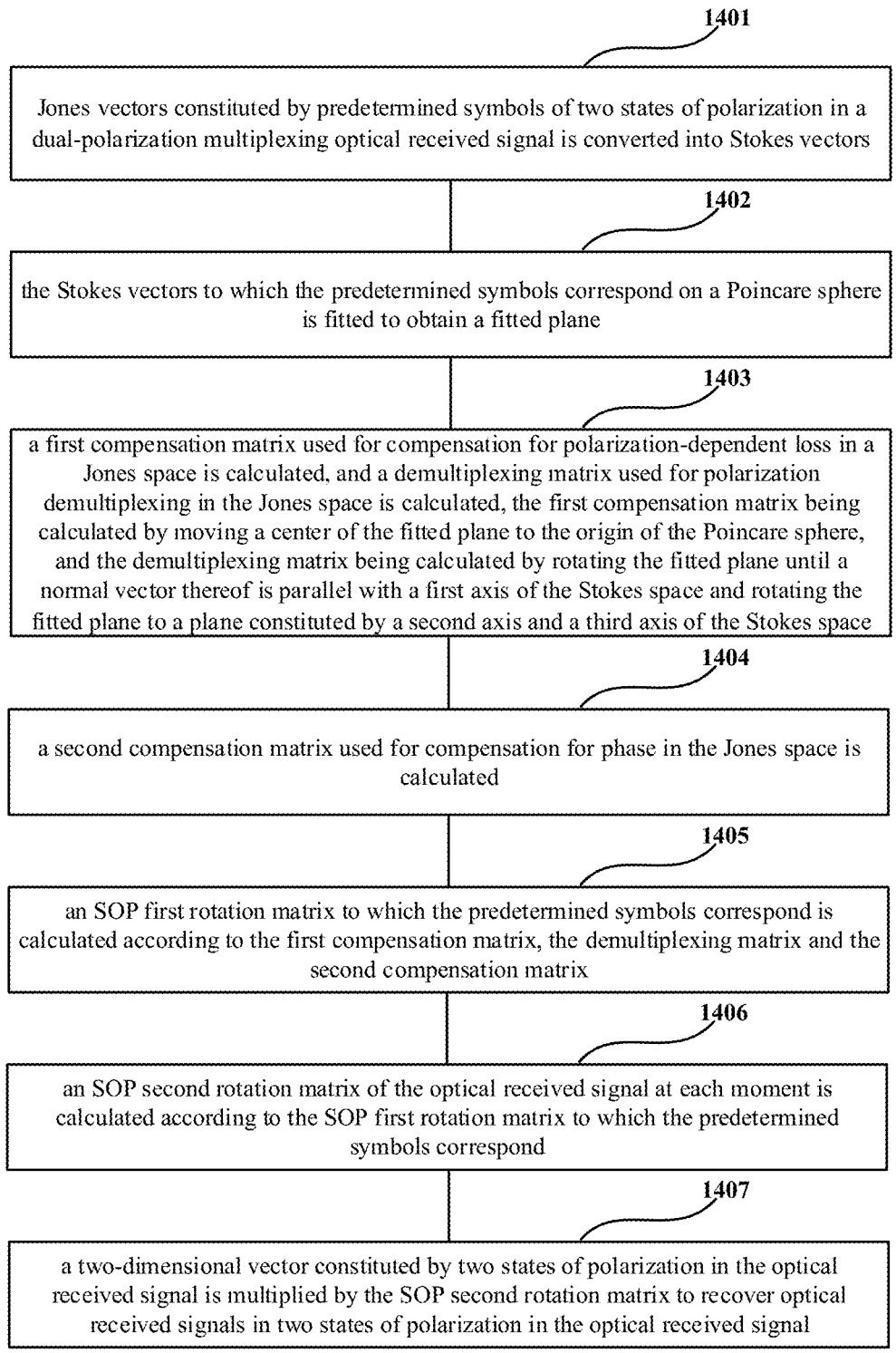
FIG. 14 is a schematic diagram of the state of polarization tracking recovery method of an embodiment of this disclosure.

FIG. 14 is a schematic diagram of the state of polarization tracking recovery method of the embodiment of this disclosure, corresponding to the fifth aspect of the embodiments. As shown in FIG. 14, the method includes:

operation 1401: Jones vectors constituted by predetermined symbols of two states of polarization in a received dual-polarization multiplexing optical signal is converted into Stokes vectors;

operation 1402: the Stokes vectors to which the predetermined symbols correspond on a Poincare sphere is fitted to obtain a fitted plane;

operation 1403: a first compensation matrix used for compensation for polarization-dependent loss in a Jones space is calculated, and a demultiplexing matrix used for polarization demultiplexing in the Jones space is calculated, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space;

operation 1404: a second compensation matrix used for compensation for phase in the Jones space is calculated;

operation 1405: an SOP first rotation matrix to which the predetermined symbols correspond is calculated according to the first compensation matrix, the demultiplexing matrix and the second compensation matrix;

operation 1406: an SOP second rotation matrix of the optical received signal at each moment is calculated according to the SOP first rotation matrix to which the predetermined symbols correspond; and operation 1407: a two-dimensional vector constituted by two states of polarization in the optical received signal is multiplied by the SOP second rotation matrix to recover optical received signals in two states of polarization in the optical received signal.

Figure 15:
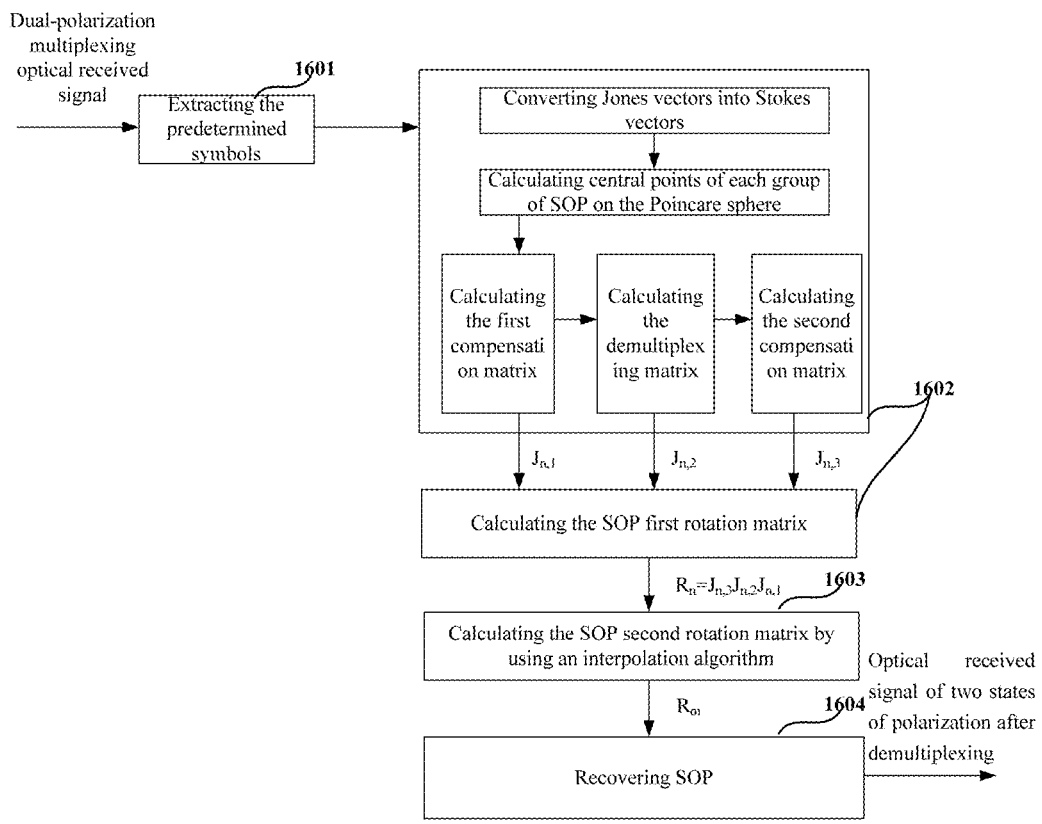
FIG. 15 is a schematic diagram of the state of polarization tracking recovery method of an embodiment of this disclosure.
Figure 16:
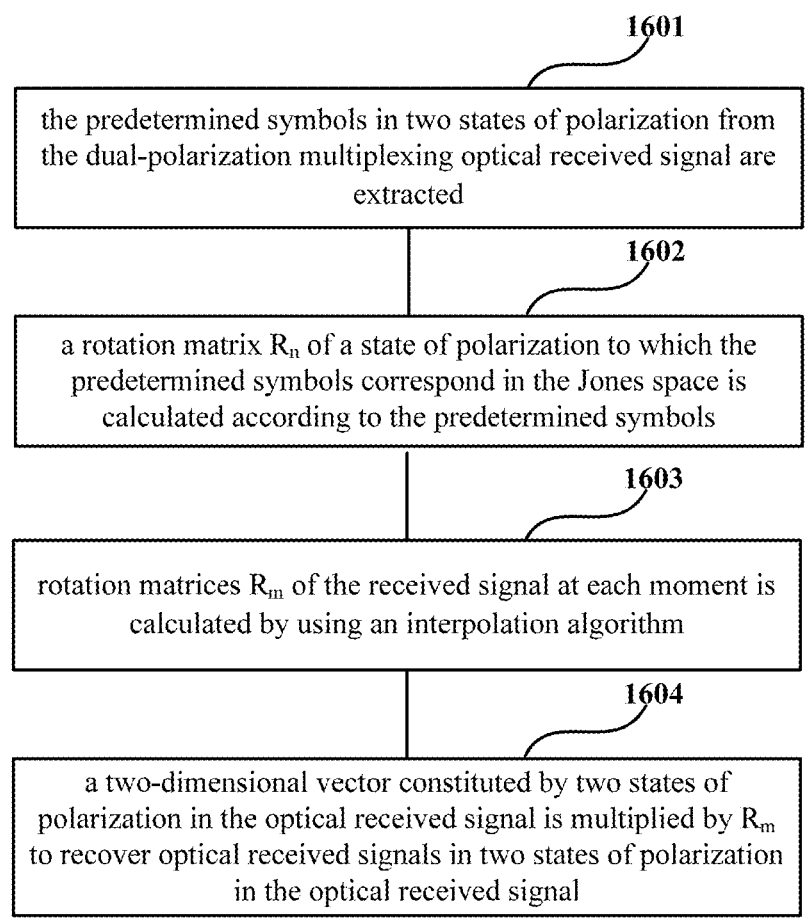
FIG. 16 is a schematic diagram of the state of polarization tracking recovery method of an embodiment of this disclosure.

FIGS. 15 and 16 are schematic diagrams of the state of polarization tracking recovery method of the embodiment of this disclosure. As shown in FIGS. 15 and 16, the method includes:

operation 1601: the predetermined symbols in two states of polarization from the received dual-polarization multiplexing optical signal are extracted;

operation 1602: a rotation matrix $R_n$ of a state of polarization to which the predetermined symbols correspond in the Jones space is calculated according to the predetermined symbols;

operation 1603: rotation matrices $R_m$ of the received signal at each moment is calculated by using an interpolation algorithm; and operation 1604: a two-dimensional vector constituted by two states of polarization in the optical received signal is multiplied by $R_m$ to recover optical received signals in two states of polarization in the optical received signal.

Figure 17:
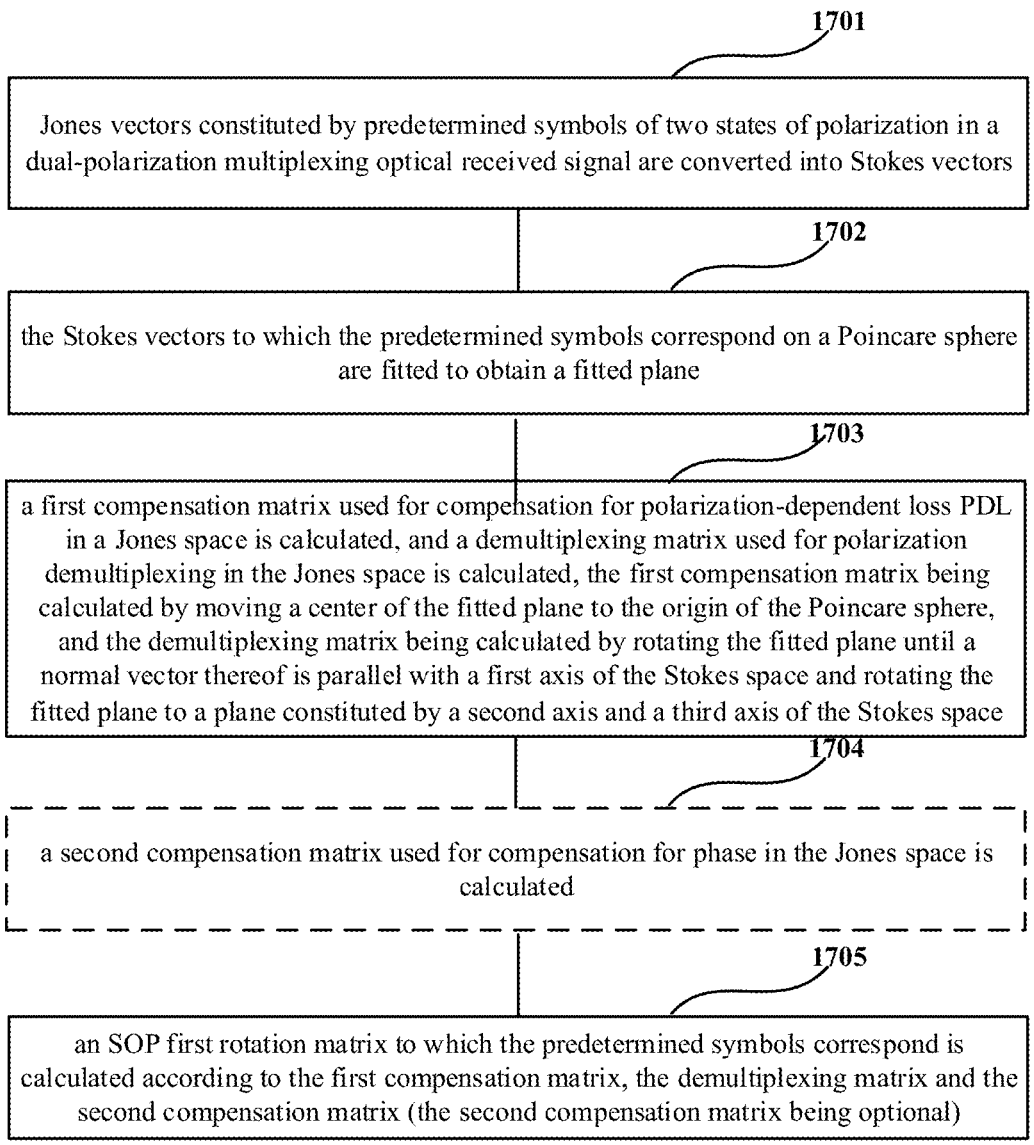
FIG. 17 is a schematic diagram of one implementation of operation 1602 of the embodiment of this disclosure.

FIG. 17 is a schematic diagram of a method for calculating the rotation matrix to which the predetermined symbols correspond in operation 1602. As shown in FIG. 17, operation 1602 includes:

operation 1701: Jones vectors constituted by predetermined symbols of two states of polarization in a received dual-polarization multiplexing optical signal are converted into Stokes vectors;

operation 1702: the Stokes vectors to which the predetermined symbols correspond on a Poincare sphere are fitted to obtain a fitted plane;

operation 1703: a first compensation matrix used for compensation for polarization-dependent loss PDL in a Jones space is calculated, and a demultiplexing matrix used for polarization demultiplexing in the Jones space is calculated, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space;

operation 1704 (optional): a second compensation matrix used for compensation for phase in the Jones space is calculated;

operation 1705: an SOP first rotation matrix to which the predetermined symbols correspond is calculated according to the first compensation matrix, the demultiplexing matrix and the second compensation matrix (the second compensation matrix being optional).

In this embodiment, reference may be made to implementations of the functions of the components in the first to fifth aspects of the embodiments for execution of the above operations, which shall not be described herein any further.

It should be noted that FIGS. 12-17 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIGS. 12-17.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that as the demultiplexing matrix used for polarization demultiplexing is calculated by rotating the fitted plane with the center being moved to the origin until the normal vector of the fitted plane is parallel with the first axis of the Stokes space and rotating the fitted plane with the center being moved to the origin to the plane constituted by a second axis and a third axis of the Stokes space, that is, PDL compensation is performed before the polarization demultiplexing, complexity of calculation may be lowered. Furthermore, the direction of the normal vector of the fitted plane may be determined by using the pilot symbols. Hence, the problems of blurring of the direction of the normal vector may be solved, and exchange of the two states of polarization after the demultiplexing will not be resulted. Moreover, as compensation for residual phase delay is performed after the polarization demultiplexing, phase noises in the demultiplexed signal may be reduced.

An embodiment of this disclosure provides a computer readable program, which, when executed in a state of polarization tracking recovery apparatus or electronic device, will cause a computer to carry out the state of polarization tracking recovery method as described in Embodiment 7 in the state of polarization tracking recovery apparatus or electronic device.

An embodiment of this disclosure provides a computer storage medium, including a computer readable program, which will cause a computer to carry out the state of polarization tracking recovery method as described in Embodiment 7 in a state of polarization tracking recovery apparatus or electronic device.

The state of polarization tracking recovery method carried out in the state of polarization tracking recovery apparatus or electronic device described in conjunction with the embodiments of this disclosure may be directly embodied as hardware, software modules executed by a processor, or a combination thereof. For example, one or more functional block diagrams and/or one or more combinations of the functional block diagrams shown in FIGS. 2A-2B, 4 and 7-11 may either correspond to software modules of procedures of a computer program, or correspond to hardware modules. Such software modules may respectively correspond to the operations shown in FIGS. 12-15. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 2A-2B, 4 and 7-11 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 2A-2B, 4 and 7-11 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this invention. Various variants and modifications may be made by those skilled in the art according to the spirits and principle of this invention, and such variants and modifications fall within the scope of this invention.

According to the implementations disclosed in the embodiments, following supplements are further disclosed.

1. A state of polarization tracking recovery method, including:

converting Jones vectors constituted by predetermined symbols of two states of polarization in a received dual-polarization multiplexing optical signal into Stokes vectors;

fitting the Stokes vectors to which the predetermined symbols correspond on a Poincare sphere to obtain a fitted plane;

calculating a first compensation matrix used for compensation for polarization-dependent loss in a Jones space, wherein the first compensation matrix is calculated by moving a center of the fitted plane to the origin of the Poincare sphere;

calculating a demultiplexing matrix used for polarization demultiplexing in the Jones space, wherein the demultiplexing matrix is calculated by rotating the fitted plane with the center being moved to the origin until a normal vector of the fitted plane is parallel with a first axis of the Stokes space and rotating the fitted plane with the center being moved to the origin to a plane constituted by a second axis and a third axis of the Stokes space;

calculating a state of polarization first rotation matrix to which the predetermined symbols correspond according to the first compensation matrix and the demultiplexing matrix;

calculating a state of polarization second rotation matrix of the optical received signal at each moment according to the state of polarization first rotation matrix to which the predetermined symbols correspond; and multiplying a two-dimensional vector constituted by two states of polarization in the optical received signal by the state of polarization second rotation matrix to recover optical received signal in two states of polarization in the optical received signal.

2. The method according to supplement 1, wherein the predetermined symbols are quadrature phase shift keying (QPSK) pilot symbols.

3. The method according to supplement 2, wherein the method further includes:

extracting the predetermined symbols in two states of polarization from the received dual-polarization multiplexing optical signal; and partitioning the predetermined symbols into blocks, each block containing a first predetermined number of symbols; and fitting Stokes vectors to which all predetermined symbols in each block correspond on the Poincare sphere by taking a block as a unit to obtain the fitted plane to which each block corresponds.

4. The method according to supplement 3, wherein the obtaining the fitted plane includes:

dividing QPSK pilot symbols in each block into groups according to positions of the QPSK pilot symbols in each block on the Poincare sphere;

calculating average values of each group to obtain center points; and fitting the center point of each group to obtain the fitted plane.

5. The method according to supplement 4, wherein the calculating a demultiplexing matrix includes: calculating the normal vector of the fitted plane according to the center point of each group, calculating an included angle between the normal vector and the first axis, determining a rotation axis of a vector of the first axis rotated to the normal vector, and calculating the demultiplexing matrix according to the included angle and the rotation axis.

6. The method according to supplement 5, wherein the calculating the normal vector includes: calculating cross products of vectors from the origin of the Poincare sphere to at least one pair of neighboring center points, and determining the normal vector according to cross product results of at least one pair of vectors, wherein an order of cross product of the at least one pair of neighboring center points is determined according to a counterclockwise order of reference points on the plane constituted by the second axis and the third axis, the reference points including: (0, 1, 0), (0, 0, 1), (0, −1, 0), (0, 0, −1).

7. The method according to supplement 4, wherein the method further includes:

calculating a second compensation matrix used for compensation for phase in the Jones space, wherein transform of the compensation for phase makes the fitted plane that has been rotated to the plane constituted by the second axis and the third axis to continue to rotate so that the center points of the groups coincide with respective reference points, the reference points including: (0, 1, 0), (0, 0, 1), (0, −1, 0), (0, 0, −1); and calculating the state of polarization first rotation matrix to which the predetermined symbols correspond according to the first compensation matrix, the demultiplexing matrix and the second compensation matrix.

8. The method according to supplement 7, wherein the calculating a second compensation matrix includes: determining an angle of rotation according to included angles between the center points of the groups and the reference points, and calculating the second compensation matrix according to the angle of rotation and a rotation axis, wherein the rotation axis is the first axis.

9. The method according to supplement 3, wherein the first predetermined number N of pilot symbols contained in an n-th block include $$\left(n - \frac{N-1}{2}\right)$$

-th pilot symbol to $$\left(n + \frac{N-1}{2}\right)$$

-th pilot symbol.

10. The method according to supplement 4, wherein the dividing QPSK pilot symbols in each block into groups includes:

determining reference points to which the pilot symbols correspond, and dividing pilot symbols with identical reference point into one group, the reference points including: (0, 1, 0), (0, 0, 1), (0, −1, 0), (0, 0, −1).

11. The method according to supplement 8, wherein the calculating the rotation axis includes:

calculating a cross product of the first axis vector and the normal vector, and determining a normalized result as the rotation axis.

12. The method according to supplement 2, wherein the calculating the state of polarization second rotation matrix of the optical received signal at each moment according to the state of polarization first rotation matrix to which the predetermined symbols correspond includes: calculating a state of polarization third rotation matrix to which non-pilot symbols of the optical received signal correspond by using an interpolation algorithm, and merging the state of polarization first rotation matrix and the state of polarization third rotation matrix to form the SOP second rotation matrix.

13. A state of polarization tracking recovery method, including:

converting Jones vectors constituted by pilot symbols of two states of polarization in a received dual-polarization multiplexing optical signal into Stokes vectors;

fitting the Stokes vectors to which the pilot symbols correspond on a Poincare sphere to obtain a fitted plane;

calculating a first compensation matrix used for compensation for polarization-dependent loss in a Jones space, and calculating a demultiplexing matrix used for polarization demultiplexing in the Jones space according to the pilot symbols, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space;

calculating a state of polarization first rotation matrix to which the pilot symbols correspond according to the first compensation matrix and the demultiplexing matrix;

calculating a state of polarization second rotation matrix of the optical received signal at each moment according to the state of polarization first rotation matrix to which the pilot symbols correspond; and multiplying a two-dimensional vector constituted by two states of polarization in the optical received signal by the state of polarization second rotation matrix to recover optical received signals in two states of polarization in the optical received signal.

14. A state of polarization tracking recovery method, including:
converting Jones vectors constituted by predetermined symbols in two states of polarization in a received dual-polarization multiplexing optical signal into Stokes vectors;
fitting the Stokes vectors to which the predetermined symbols correspond on a Poincare sphere to obtain a fitted plane;
calculating a first compensation matrix used for compensation for polarization-dependent loss (PDL) in a Jones space, and calculating a demultiplexing matrix used for polarization demultiplexing in the Jones space, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space;
calculating a second compensation matrix used for compensation for phase in the Jones space;
calculating a state of polarization first rotation matrix to which the predetermined symbols correspond according to the first compensation matrix, the demultiplexing matrix and the second compensation matrix;
calculating a state of polarization second rotation matrix of the optical received signal at each moment according to the state of polarization first rotation matrix to which the predetermined symbols correspond; and
multiplying a two-dimensional vector constituted by two states of polarization in the optical received signal by the state of polarization second rotation matrix to recover optical received signals in two states of polarization in the optical received signal.

What is claimed is:

1. An apparatus for state of polarization tracking recovery, comprising:
a memory that stores a plurality of instructions; and
a processor coupled to the memory and configured to:
convert Jones vectors constituted by predetermined symbols of two states of polarization in a received dual-polarization multiplexing optical signal into Stokes vectors;
fit the Stokes vectors to which the predetermined symbols correspond on a Poincare sphere to obtain a fitted plane;
calculate a compensation matrix used for compensation for polarization-dependent loss (PDL) in a Jones space, wherein the compensation matrix is calculated by moving a center of the fitted plane to an origin of the Poincare sphere;
calculate a demultiplexing matrix used for polarization demultiplexing in the Jones space, wherein the demultiplexing matrix is calculated by rotating the fitted plane with the center of the fitted plane being moved to the origin until a normal vector of the fitted plane is parallel with a first axis of the Stokes space and rotating the fitted plane with the center of the fitted plane being moved to the origin to a plane constituted by a second axis and a third axis of the Stokes space;
calculate a state of polarization (SOP) first rotation matrix to which the predetermined symbols correspond according to the compensation matrix and the demultiplexing matrix;
calculate a state of polarization (SOP) second rotation matrix of the optical received signal at each moment according to the state of polarization (SOP) first rotation matrix to which the predetermined symbols correspond; and
multiply a two-dimensional vector constituted by two states of polarization in the optical received signal by the state of polarization (SOP) second rotation matrix to recover optical received signal in two states of polarization in the received optical signal.

2. The apparatus according to claim 1, wherein the predetermined symbols are quadrature phase shift keying (QPSK) pilot symbols.

3. The apparatus according to claim 2, wherein the processor is further configured to:
extract the predetermined symbols in two states of polarization from the received dual-polarization multiplexing optical signal,
partition the predetermined symbols into blocks, each block containing a first predetermined number of symbols, and
take a block as a unit, and fit Stokes vectors to which all predetermined symbols in each block correspond on the Poincare sphere to obtain the fitted plane to which each block corresponds.

4. The apparatus according to claim 3, wherein the processor is further configured to:
divide quadrature phase shift keying pilot symbols in each block into groups according to positions of the quadrature phase shift keying pilot symbols in each block on the Poincare sphere;
calculate average values of each group to obtain center points; and
fit a respective center point of each group to obtain the fitted plane.

5. The apparatus according to claim 4, wherein the processor calculates the normal vector of the fitted plane according to the respective center point of each group, calculates an included angle between the normal vector and the first axis, determines a rotation axis of a vector of the first axis rotated to the normal vector, and calculates the demultiplexing matrix according to the included angle and the rotation axis.

6. The apparatus according to claim 5, wherein the processor calculates cross products of vectors from the origin of the Poincare sphere to at least one pair of neighboring center points, and determines the normal vector according to cross product results of at least one pair of vectors,
wherein an order of cross product of the at least one pair of neighboring center points is determined according to a counterclockwise order of reference points on the plane constituted by the second axis and the third axis, the reference points comprising: (0, 1, 0), (0, 0, 1), (0, −1, 0), (0, 0, −1).

7. The apparatus according to claim 4, wherein the compensation matrix is a first compensation matrix and the processor is further configured to:
calculate a second compensation matrix used for compensation for phase in the Jones space, wherein the second compensation matrix is calculated by continuing to rotate the fitted plane that has been rotated to the plane constituted by the second axis and the third axis so that the center points of the groups coincide with respective reference points, the reference points comprising: (0, 1, 0), (0, 0, 1), (0, −1, 0), (0, 0, −1); and calculate the state of polarization (SOP) first rotation matrix to which the predetermined symbols correspond according to the first compensation matrix, the demultiplexing matrix and the second compensation matrix.

8. The apparatus according to claim 7, wherein the processor is further configured to determine an angle of rotation according to included angles between the center points of the groups and the reference points, and calculate the second compensation matrix according to the angle of rotation and a rotation axis, wherein the rotation axis is the first axis.

9. The apparatus according to claim 3, wherein the first predetermined number N of pilot symbols contained in an n-th block include $$\left(n - \frac{N-1}{2}\right)$$

-th pilot symbol to $$\left(n + \frac{N-1}{2}\right)$$

-th pilot symbol.

10. The apparatus according to claim 4, wherein the processor is further configured to determine reference points to which the pilot symbols correspond, and divide pilot symbols with identical reference point into one group, the reference points including: (0, 1, 0), (0, 0, 1), (0, −1, 0), (0, 0, −1).

11. The apparatus according to claim 8, wherein the processor is further configured to calculate a cross product of the first axis vector and the normal vector, and determine a normalized result as the rotation axis.

12. The apparatus according to claim 2, wherein the processor is further configured to calculate a state of polarization third rotation matrix to which non-pilot symbols of the optical received signal correspond by using an interpolation algorithm, and merge the state of polarization first rotation matrix and the state of polarization third rotation matrix to form the SOP second rotation matrix.

13. An apparatus for state of polarization tracking recovery, comprising:
a memory that stores a plurality of instructions; and
a processor coupled to the memory and configured to:
convert Jones vectors constituted by pilot symbols of two states of polarization in a received dual-polarization multiplexing optical signal into Stokes vectors;
fit the Stokes vectors to which the pilot symbols correspond on a Poincare sphere to obtain a fitted plane;
calculate a compensation matrix used for compensation for polarization-dependent loss (PDL) in a Jones space, and calculate a demultiplexing matrix used for polarization demultiplexing in the Jones space according to the pilot symbols, the compensation matrix being calculated by moving a center of the fitted plane to an origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space;
calculate a state of polarization (SOP) first rotation matrix to which the pilot symbols correspond according to the compensation matrix and the demultiplexing matrix;
calculate a state of polarization (SOP) second rotation matrix of the optical received signal at each moment according to the state of polarization (SOP) first rotation matrix to which the pilot symbols correspond; and
multiply a two-dimensional vector constituted by two states of polarization in the optical received signal by the state of polarization (SOP) second rotation matrix to recover optical received signals in two states of polarization in the optical received signal.

14. An apparatus for state of polarization tracking recovery, comprising:
a memory that stores a plurality of instructions; and
a processor coupled to the memory and configured to:
convert Jones vectors constituted by predetermined symbols in two states of polarization in a received dual-polarization multiplexing optical signal into Stokes vectors;
fit the Stokes vectors to which the predetermined symbols correspond on a Poincare sphere to obtain a fitted plane;
calculate a first compensation matrix used for compensation for polarization-dependent loss (PDL) in a Jones space, and calculate a demultiplexing matrix used for polarization demultiplexing in the Jones space, the first compensation matrix being calculated by moving a center of the fitted plane to the origin of the Poincare sphere, and the demultiplexing matrix being calculated by rotating the fitted plane until a normal vector thereof is parallel with a first axis of the Stokes space and rotating the fitted plane to a plane constituted by a second axis and a third axis of the Stokes space;
calculate a second compensation matrix used for compensation for phase in the Jones space;
calculate a state of polarization (SOP) first rotation matrix to which the predetermined symbols correspond according to the first compensation matrix, the demultiplexing matrix and the second compensation matrix;
calculate a state of polarization (SOP) second rotation matrix of the optical received signal at each moment according to the state of polarization (SOP) first rotation matrix to which the predetermined symbols correspond; and
multiply a two-dimensional vector constituted by two states of polarization in the optical received signal by the state of polarization (SOP) second rotation matrix to recover optical received signals in two states of polarization in the optical received signal.

* * * * *